United States Patent
Cheung

(10) Patent No.: US 10,751,961 B2
(45) Date of Patent: Aug. 25, 2020

(54) INJECTION MOULDING METHOD FOR THE PRODUCTION OF MOULDED PARTS, MOULDED PART PRODUCED BY MEANS OF INJECTION MOULDING AND ALSO INJECTION MOULD

(71) Applicant: EMS-PATENT AG, Domat/Ems (CH)

(72) Inventor: Ming-Jiann Cheung, Suzhou (CN)

(73) Assignee: EMS-PATENT AG, Domat/Ems (CH)

( * ) Notice: Subject to any disclaimer, the term of this patent is extended or adjusted under 35 U.S.C. 154(b) by 125 days.

(21) Appl. No.: 15/385,519

(22) Filed: Dec. 20, 2016

(65) Prior Publication Data

US 2017/0225414 A1 Aug. 10, 2017

(30) Foreign Application Priority Data

Dec. 23, 2015 (EP) .................................... 15202456

(51) Int. Cl.
| | |
|---|---|
| *B29C 70/88* | (2006.01) |
| *B29C 45/26* | (2006.01) |
| *B29C 45/00* | (2006.01) |
| *B29C 45/73* | (2006.01) |
| *B29C 70/06* | (2006.01) |
| *B29C 45/78* | (2006.01) |

(Continued)

(52) U.S. Cl.
CPC .......... *B29C 70/88* (2013.01); *B29C 45/0005* (2013.01); *B29C 45/0025* (2013.01);
(Continued)

(58) Field of Classification Search
CPC .... B29C 2045/0044; B29C 2045/7343; B29C 2045/7356; B29C 2045/7393;
(Continued)

(56) References Cited

U.S. PATENT DOCUMENTS

| | | | | |
|---|---|---|---|---|
| 4,439,492 A | * | 3/1984 | Wada | ...................... B29C 33/06 264/403 |
| 6,936,206 B1 | * | 8/2005 | Satoh | ...................... B29C 33/04 264/255 |

(Continued)

FOREIGN PATENT DOCUMENTS

| | | |
|---|---|---|
| CN | 1302249 A | 7/2001 |
| CN | 101674924 A | 3/2010 |

(Continued)

OTHER PUBLICATIONS

Deckert, "Development contribution of a high dynamical variothermal temperature control system for an injection mold", *Dissertation at the Faculty for Mechanical Engineering at Chemnitz University of Technology, Institute of Lightweight Structures, Department of Lightweight Structures and Polymer Technology, Chemnitz*, 144 pp. (2011).

(Continued)

*Primary Examiner* — Matthew J Daniels
*Assistant Examiner* — Yunju Kim
(74) *Attorney, Agent, or Firm* — Leydig, Voit & Mayer, Ltd.

(57) ABSTRACT

The present invention relates to a method for the production of injection-moulded, reinforced moulded parts, the fibre orientation of which is specifically adjusted on a local basis. Via suitable, dynamically controlled supplementary heating in the wall of the injection mould which is used (variotherm heatable channel), a local cavity region is hereby heated at the time of injection to a temperature in the region of or above the solidification temperature (in any case above the crystallisation temperature in the case of partially crystalline plastic materials or above the glass transition temperature in the case of amorphous plastic materials) of the polymer (plastic material moulding compound).

16 Claims, 15 Drawing Sheets

(51) Int. Cl.
*B29K 101/12* (2006.01)
*B29K 105/06* (2006.01)

(52) U.S. Cl.
CPC .......... *B29C 45/2669* (2013.01); *B29C 45/73* (2013.01); *B29C 70/06* (2013.01); *B29C 2045/0044* (2013.01); *B29C 2045/7343* (2013.01); *B29C 2045/7356* (2013.01); *B29C 2045/7393* (2013.01); *B29K 2101/12* (2013.01); *B29K 2105/06* (2013.01); *B29K 2995/004* (2013.01); *B29K 2995/0039* (2013.01); *B29K 2995/0044* (2013.01)

(58) Field of Classification Search
CPC ............ B29C 45/0005; B29C 45/0025; B29C 45/2669; B29C 45/73; B29C 70/06; B29C 70/88; B29C 45/08; B29C 45/43; B29C 45/16; B29K 2101/12; B29K 2105/06; B29K 2995/0039; B29K 2995/004; B29K 2995/0044; B32B 9/00; B32B 37/06
USPC ................... 264/328.18, 255; 428/409, 35.7; 296/187.01; 156/64
See application file for complete search history.

(56) References Cited

U.S. PATENT DOCUMENTS

| | | | | |
|---|---|---|---|---|
| 2010/0092706 | A1* | 4/2010 | Clarke | .................. B29C 45/561 428/35.7 |
| 2011/0198013 | A1* | 8/2011 | Christiansen | ........... B29C 33/02 156/64 |
| 2011/0316306 | A1* | 12/2011 | Grgac | ................. B29C 45/0005 296/187.01 |
| 2016/0120767 | A1* | 5/2016 | Williams-Blair | .... A61K 8/0216 424/440 |

FOREIGN PATENT DOCUMENTS

| | | |
|---|---|---|
| CN | 102205575 A | 10/2011 |
| WO | WO 2009/036089 A1 | 3/2009 |

OTHER PUBLICATIONS

Kastner et al., "Pipeline for Three-Dimensional Evaluation and Visualization of the Fiber Distribution in Glass-Fiber Reinforced Plastic Parts From X-ray Computer Tomography Data", *DACH Annual Conference in St. Gallen*, 9 pp. (2008).

European Search Report, Search Report issued in European Application No. 15202456.8 (dated Mar. 30, 2017) 4 pp.

National Intellectual Property Adminstration of the People's Republic of China, Third Office Action in Chinese Patent Application No. 201611205770.5 (dated Mar. 25, 2019).

China National Intellectual Property Adminstration, Second Office Action and Search Report in Chinese Patent Application No. 201611205770.5 (dated Jan. 6, 2020).

* cited by examiner

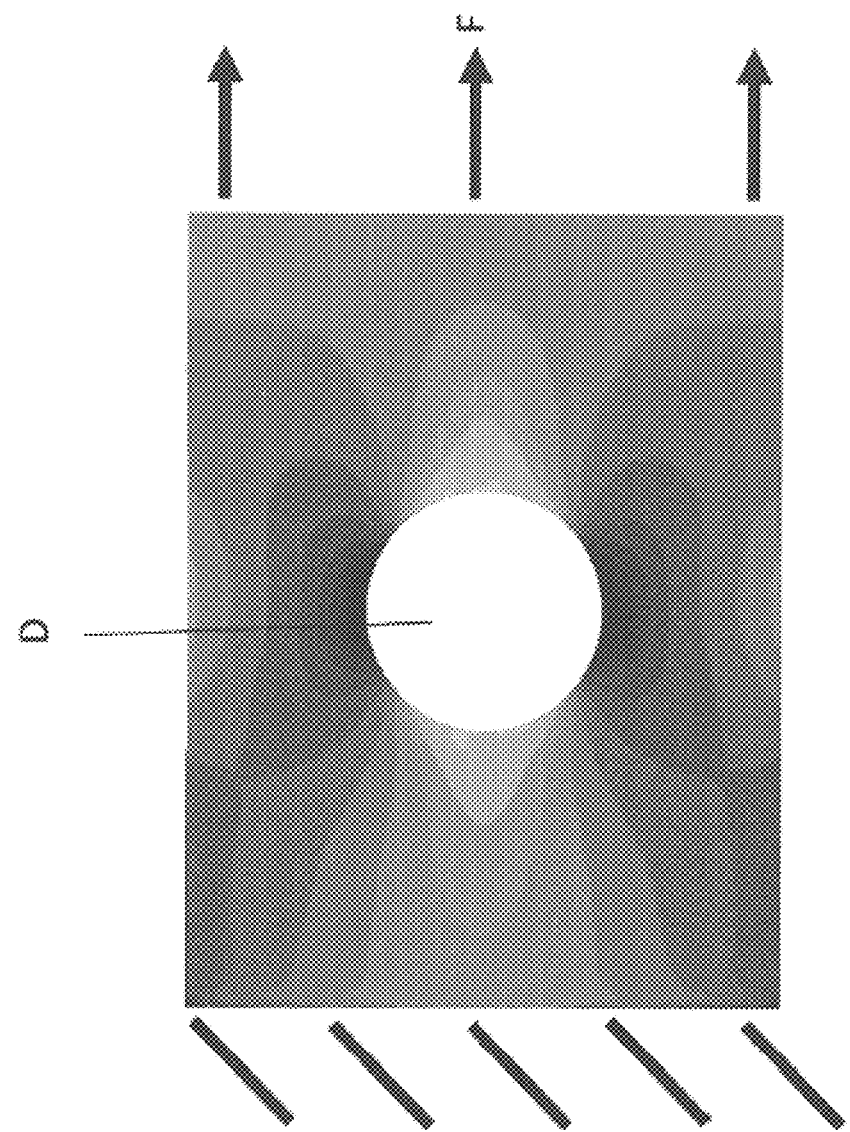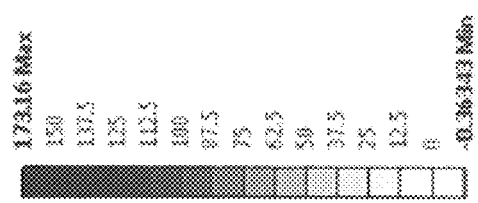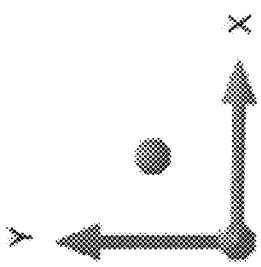
Fig. 1

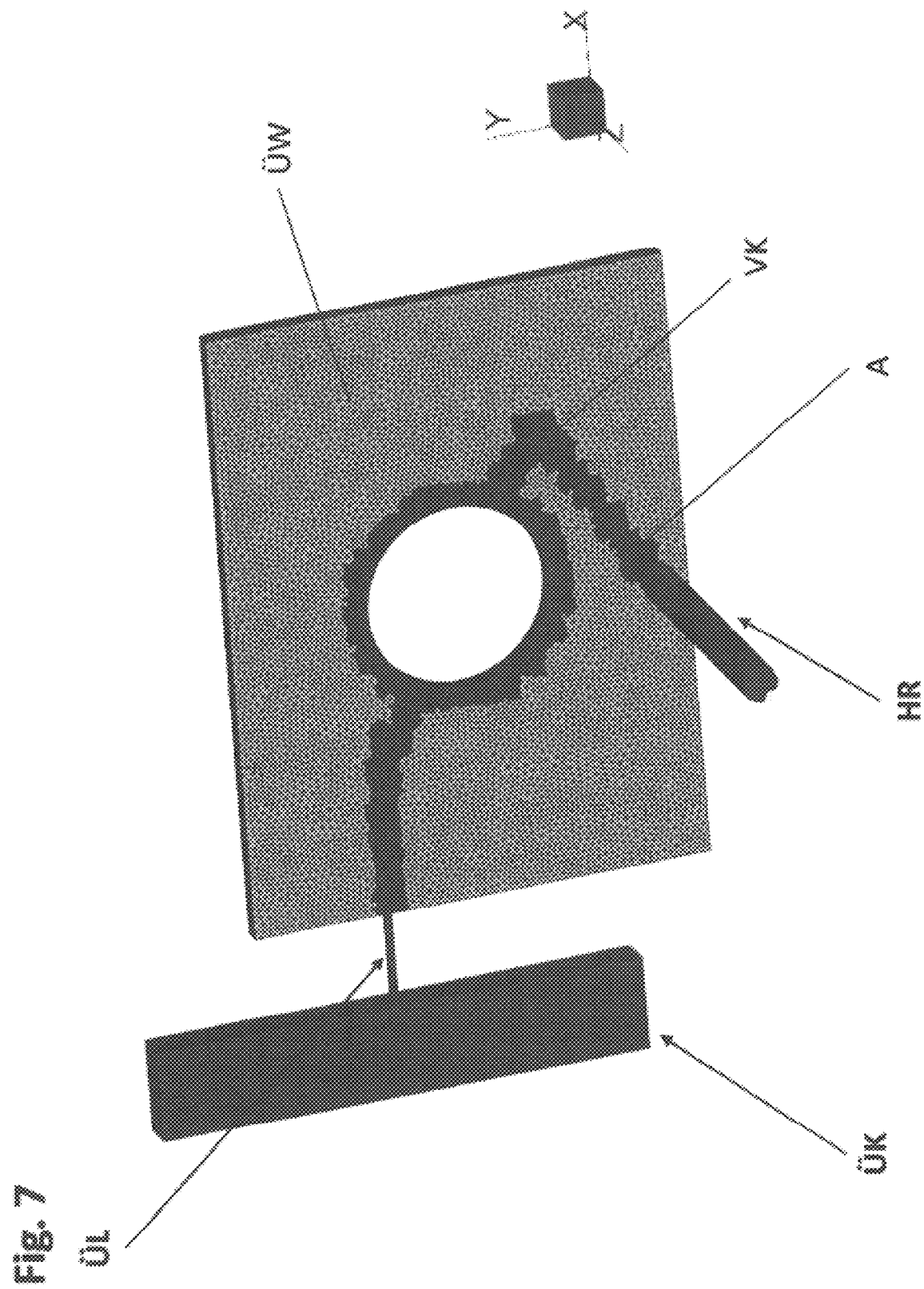

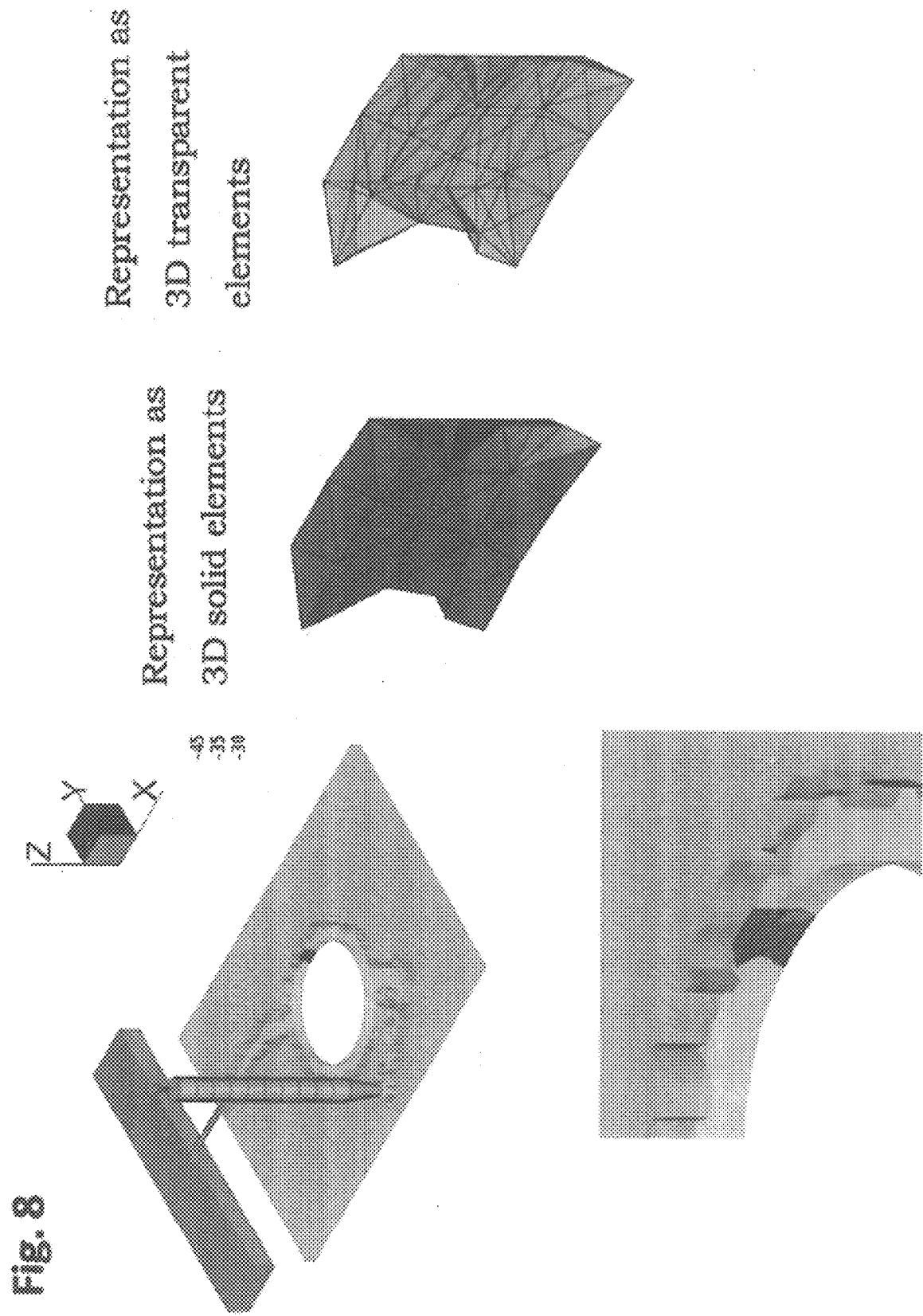

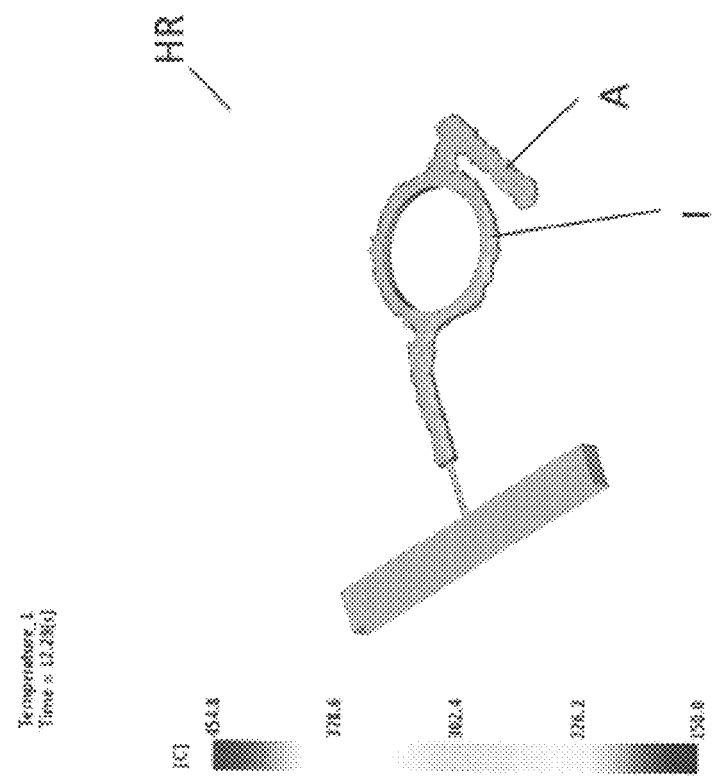
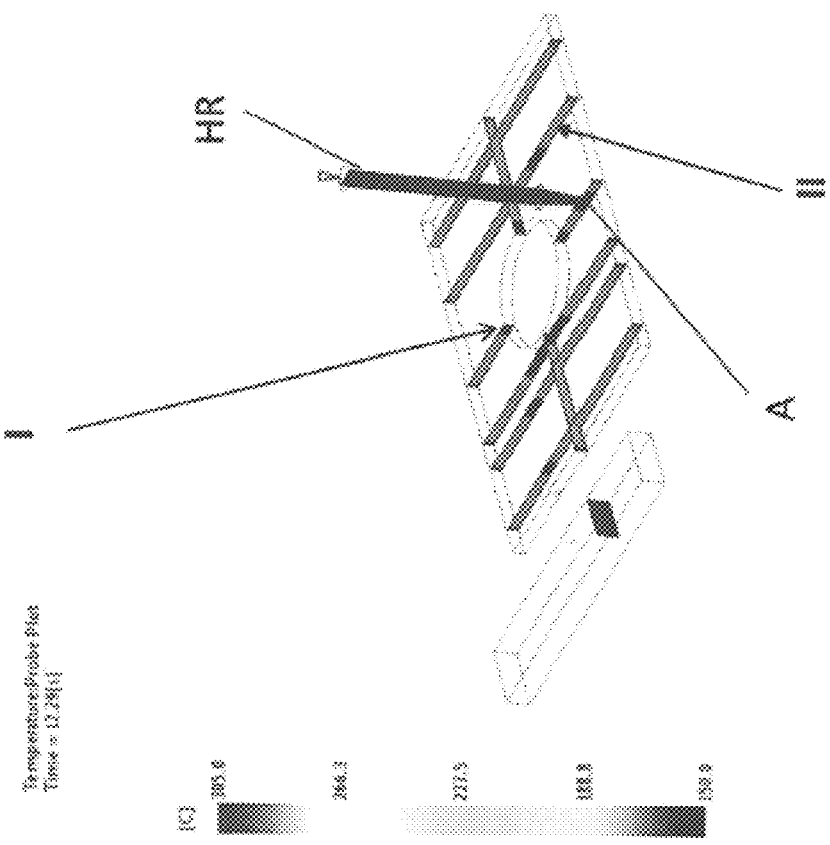
Fig. 10B
Fig. 10A

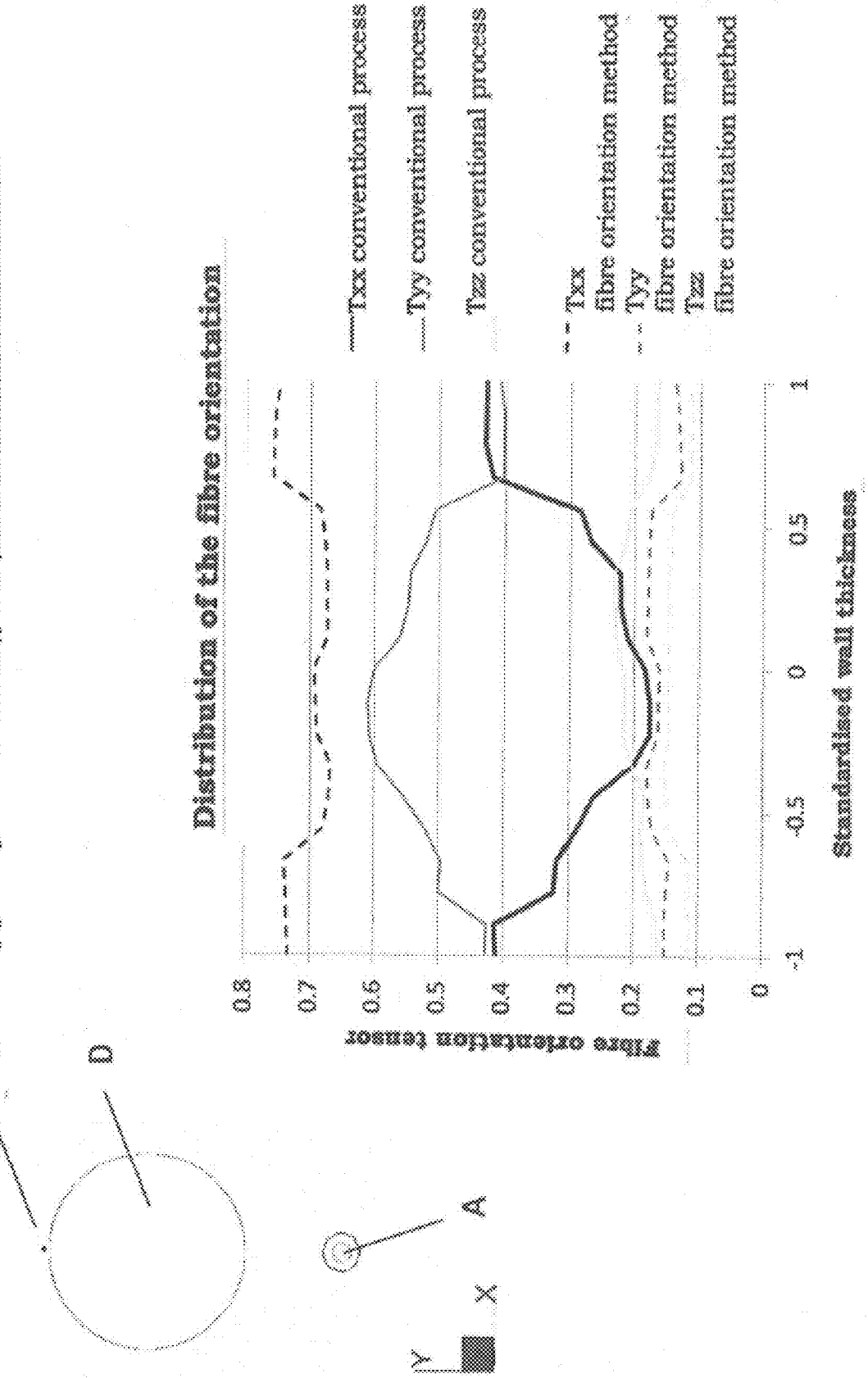

E: anisotropic standard linear    Fig. 15A
User Defined Result 2
Expression: svar34
Time 1
Max: 0.16928
Min: 0.0998829
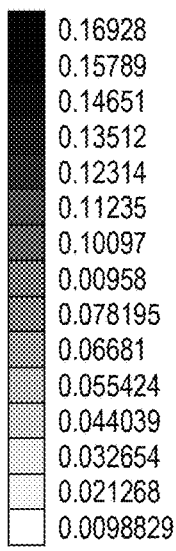
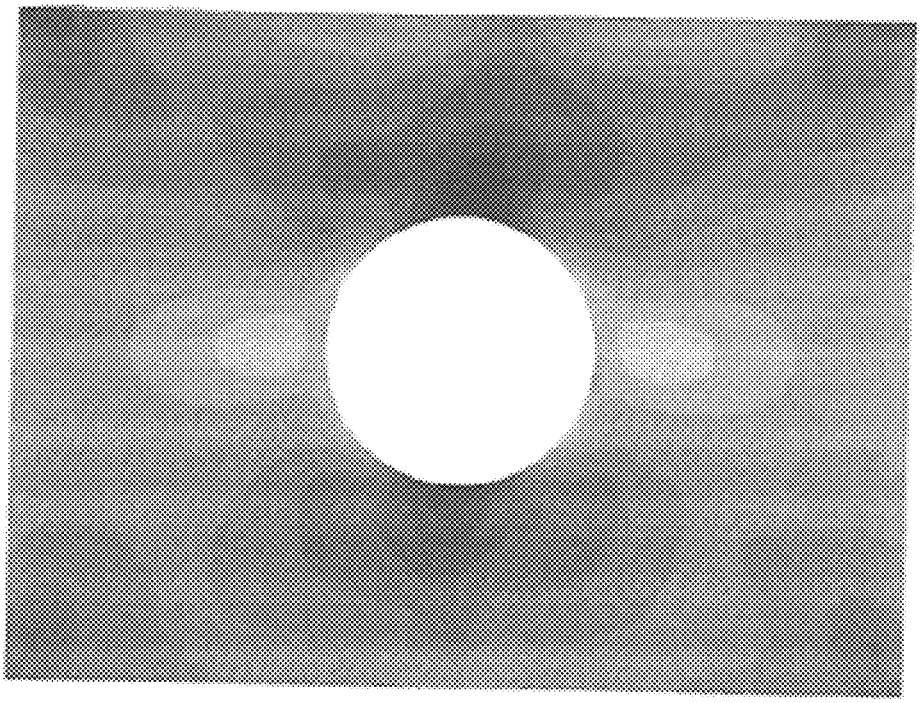
F: anisotropic vario linear    Fig. 15B
User Defined Result 2
Expression: svar34
Time 1
Max: 0.11253
Min: 0.008163
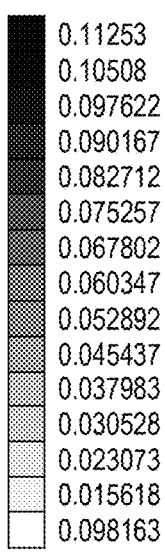
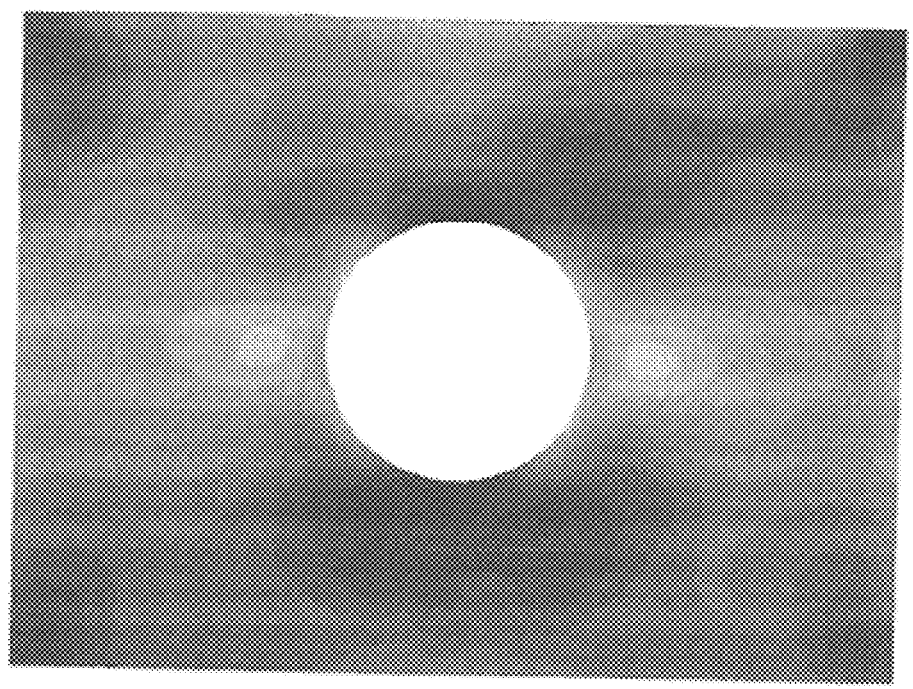

INJECTION MOULDING METHOD FOR THE PRODUCTION OF MOULDED PARTS, MOULDED PART PRODUCED BY MEANS OF INJECTION MOULDING AND ALSO INJECTION MOULD

CROSS-REFERENCE TO RELATED APPLICATION

This patent application claims the benefit of European Patent Application No. 15 202 456.8, filed on Dec. 23, 2015, the disclosure of which is incorporated herein by reference in its entirety for all purposes.

BACKGROUND OF THE INVENTION

The present invention relates to a method for the production of injection-moulded, reinforced moulded parts, the fibre orientation of which is specifically adjusted on a local basis. Via suitable, dynamically controlled supplementary heating in the wall of the injection mould which is used (variotherm heatable channel), a local cavity region is hereby heated at the time of injection to a temperature in the region of or above the solidification temperature (in any case above the crystallisation temperature in the case of partially crystalline plastic materials or above the glass transition temperature in the case of amorphous plastic materials) of the polymer (plastic material moulding compound).

In conventional injection moulding, a plastic material melt is injected into a temperature-controlled mould, the mould wall temperature of which is normally below the solidification temperature for the respective plastic material (crystallisation temperature in the case of partially crystalline plastic materials or the glass transition temperature in the case of amorphous plastic materials). The core of the melt front thereby remains flowable and the plastic material is driven forwards in the cavity by the injection pressure, whilst the edge zones in the vicinity of the mould wall rapidly cool down and solidify. If the mould cavity is filled and the plastic material is completely solidified, the moulded part is released from the mould. Over the entire injection-moulding cycle, the mould wall is kept at the same temperature. The mould temperature-control can hence be understood as cooling in order to dissipate the heat energy of the melt, including any possible crystallisation heat, which is introduced into the mould during each injection.

In the case of long flow paths and simultaneously thin wall thicknesses, this can lead to freezing of the cross-section and hence prevent complete filling of the cavity. Furthermore, structured and high-gloss surfaces are not completely reproduced. In addition, if flow fronts flow together, the result is formation of visible joint lines.

The so-called variotherm mould temperature-control offers a remedy for the above-mentioned problems. Via supplementary heating, the cavity is heated up at the time of injection to the level of the melt temperature (at least above the crystallisation temperature) of the partially crystalline plastic material (or glass transition temperature in the case of amorphous plastic materials) and, after completion of the mould filling, it is cooled down to temperatures significantly below the solidification temperature. Heating of the mould wall is hereby effected essentially over the entire surface and hence uniformly. As a result of the higher melt- and mould temperature which can be achieved with this method during injection moulding, the viscosity of the polymer melt is significantly reduced and the moulding of problematic parts is improved or made possible at all. The temperature changes must thereby be effected as rapidly as possible in order that an adequate productivity can be ensured.

The advantages of variotherm mould temperature-control are:
- less distortion and deformations of the components
- formation of high-gloss surfaces, even with foamed plastic materials
- avoidance of fibre traces on the surface of the moulded parts
- moulding of thin-walled components possible
- reducing the cycle times in the case of thick-walled components
- higher homogeneity and hence greater strengths
- no visible joint lines In this type of variotherm mould temperature-control, the entire cavity (mould wall) is heated up or cooled down during the injection-moulding cycle. In the case of non-reinforced moulding compounds, a definite improvement in the joint line strength can be ascertained If, in contrast, reinforced moulding compounds, which include for example carbon- or glass fibres as reinforcing fibres, are injected, the fibre orientation does not change with variotherm mould temperature-control relative to conventional injection moulding methods since the fibre orientation is defined primarily by the gate location and the flow paths resulting therefrom. Hence, in fact some joint lines disappear visually from the surface of the moulded part but not from the moulded part itself. Since the strength of the moulded part based on reinforced moulding compounds is dominated by the fibre orientation, the joint line strength is hence in no way improved.

It is therefore the object of the present invention to provide a new injection moulding method which can adjust the orientation of reinforcing fibres within a plastic material melt in a defined manner by means of a locally limited, variotherm mould temperature-control and hence the strength in the principal loading direction (direction of the principal stress) of the moulded part is improved.

In addition, it is the object of the present invention to indicate a corresponding moulded part in which specific alignment of the orientation of the contained fibres is present. A further object of the present invention is to provide a corresponding injection mould for the production of a moulded part according to the invention or for implementing a method according to the invention.

BRIEF SUMMARY OF THE INVENTION

This object is achieved, with respect to a method according to the invention, by the features of the moulded part and by the features of the injection mould described herein as well as the advantageous developments thereof.

The present invention hence relates to an injection moulding method for the production of moulded parts made of thermoplastic moulding compounds, these moulding compounds comprising reinforcing fibres.

The thermoplastic moulding compounds are thereby filled into an injection mould in the plasticised state, the injection mould hereby has a cavity which reproduces the outer shape of the moulded part to be produced. The thermoplastic moulding compounds are thereby heated to a prescribed temperature $\vartheta_{FM}$, this temperature is thereby chosen to be so high that it is ensured that the thermoplastic moulding compound is in the plasticised state in which injection moulding can be effected.

The injection mould thereby has a gate location via which the thermoplastic moulding compound can be fed into the cavity of the injection mould. Normally, injection moulds have a single gate location, however the invention is not restricted to this specific embodiment, it is equally possible that the injection mould has a plurality of gate locations.

According to the method according to the invention, it is now provided that the cavity of the injection mould is overfilled, completely filled or partially filled to a prescribed filling amount with the thermoplastic moulding compound. Overfilling thereby means that, compared with the volume of the cavity of the injection mould, a greater volume of thermoplastic moulding compound is fed into the cavity of the injection mould. Overfilling of the cavity of the injection mould hence implies that a part of the thermoplastic moulding compound, namely the volume-wise excess of moulding compound, must emerge from the cavity of the injection mould. This can be effected for example via discharge openings provided for this purpose in the cavity of the injection mould but also by excess moulding compound emerging via contact points, via for example the two partial moulds which form the injection mould and via which the cavity is enclosed. Likewise, it is however possible that the cavity of the injection mould is completely filled, precisely the volume of a thermoplastic moulding compound which corresponds to the volume of the cavity of the injection mould is hereby fed into the cavity of the injection mould. Alternatively, it is possible in addition that the cavity of the injection mould is filled merely partially, for example to a prescribed filling level, a smaller volume of the thermoplastic moulding compound, compared with the volume of the cavity of the injection mould, is hereby fed into the injection mould.

According to the invention, it is now provided that the cavity of the injection mould in at least one wall has at least one variotherm heatable channel which extends along a trajectory.

By means of this at least one variotherm heatable channel, non-homogeneous heating of the wall defining the cavity of the injection mould is possible. By means of the at least one variotherm heatable channel, temperature gradients can hence be realized in the wall of the injection mould. In comparison with the state of the art, by means of the variotherm temperature-control technique no full-surface heating of the wall of the cavity of the injection mould is hence effected but merely a locally limited temperature-control which enables the above-mentioned effects.

The variotherm heatable channel or channels are thereby embedded in the wall of the injection mould. The variotherm heatable channel thereby serves for temperature-control of the wall of the injection mould and hence of the surface of the cavity. The trajectory of the variotherm heatable channel or channels is understood to be the direction which the channel or the channels adopt parallel to the wall defining the cavity of the injection mould. Preferably, the trajectory is that vectorial component which extends parallel to the wall defining the cavity of the injection mould and which, in projection onto the surface, reproduces the course of the variotherm heatable channel or channels. In the case where the variotherm heatable channel is configured as a uniformly wide strip, the trajectory for example is formed along the central line of this channel. The determination of the trajectory along the central line can likewise be undertaken in the case of varying widths of the variotherm heatable channel.

The trajectory is thereby preferably differentiable and/or constant over the entire course thereof; from this regions are for example excluded at which branching of the channel and hence also of the corresponding trajectory is provided. Courses of the trajectory, given by way of example, can thereby be linear, curved, undulating or even circular over a common inflow and outflow.

According to a preferred embodiment, it is provided that merely one single variotherm heatable channel is present in the wall of the injection mould or, per wall of the injection mould, there is one single variotherm heatable channel present. Likewise, it is possible that the at least one variotherm heatable channel has branching points and can extend, in a plurality of regions which may be bundled together again to form a single variotherm heatable channel.

In the case where the injection mould has a plurality of variotherm heatable channels, it must be ensured that these are at a sufficiently large spacing from each other such that no homogeneous heating of the wall of the cavity of the mould is effected but rather a non-homogeneous temperature profile is achieved. It must hereby be ensured during the injection moulding process that the thermoplastic moulding compound in the region of the variotherm channel or the variotherm channels remains still processible, i.e. molten, whilst higher viscosity is provided in the remaining regions or the thermoplastic moulding compound there is already solidified.

In the case of the method according to the invention, it is now provided that, before, during and/or after filling of the injection mould, the region of the injection mould which has the at least one variotherm channel of the wall is set permanently or at least at times to a temperature $\vartheta_{VT}$ and the remaining region of the wall of the injection mould to a temperature $\vartheta_W$, there applying $\vartheta_W < \vartheta_T$. This temperature difference is maintained at least until the final cooling of the thermoplastic moulding compound.

The previously-mentioned temperature difference in the different regions of the injection mould can be maintained for example over the entire duration of the injection-moulding cycle, i.e. of the method according to the invention, at least however until cooling of the thermoplastic moulding compound until solidification. This cooling can be achieved for example by no longer heated or actively cooling the injection mould in its entirety.

Likewise, it is possible that, at the beginning of the injection-moulding process, firstly $\vartheta_W = \vartheta_{VT}$ applies, i.e. the entire injection mould has the same temperature. Only in the course of the process, i.e. for example during filling or else only in the case of overfilling or both during the filling and the overfilling, the variotherm heatable channels can be temperature-controlled to a higher temperature than the remaining regions of the injection mould. The temperature difference can thereby also be achieved by the wall of the injection mould being lowered in the remaining regions by for example no longer being heated or cooled there, the temperature in the variotherm channels being maintained for example by heating.

The temperature-control of the variotherm heatable channel or channels is made possible by selective heating of the variotherm channel.

Heating of the variotherm heatable channel can be achieved by means of heating methods known from the state of the art. Such possibilities are known from the state of the art, reference is made in this respect, by way of example, to the publication "Beitrag zur Entwicklung eines hochdynamischen variothermen Temperiersystems Mr Spritzgief-Bwerkzeuge" (Article on the Development of a High-Dynamic Variotherm Temperature-Control System for Injection Moulds), thesis of M. H. Deckert, Technical University Chemnitz, filed on 16 Sep. 2011. All of the possibilities, presented therein, for realizing variotherm temperature-control systems can also be used for temperature-control of a variotherm heatable channel according to the present invention.

After overfilling, complete filling or partial filling to a prescribed filling level, the thermoplastic moulding compound comprising the reinforcing fibres is cooled until solidification, the thus produced moulded part is subsequently released from the injection mould.

The essential aspect of the present invention is hence the presence of one or more variotherm heatable channels which extend in the wall of the injection mould along a prescribed trajectory. By means of this or these variotherm extending channel or channels, specific temperature-control of the plastic moulding compound situated in the cavity of the injection mould is hence adjustable along this trajectory. The temperature distribution at the surface of the wall of the cavity of the injection mould is hence non-homogeneous, a temperature which is higher at least at times than in the remaining regions of the wall of the injection mould can thereby be achieved along the trajectory of the variotherm heatable channel or channels. The thermoplastic moulding compound filled into the cavity of the injection mould can hence be further heated in these regions independently of the remaining regions and hence can be brought to a higher temperature level so that the temperature of the moulding compound in these regions is above the level of the remaining moulding compound. Consequently, it becomes possible that the viscosity of the thermoplastic moulding compound is reduced because of this further heating and the achieved higher temperature level and a flow of the thermoplastic moulding compound along the trajectory of the variotherm heatable channel or channels is hence assisted. A flow of the thermoplastic moulding compound along this trajectory is hence assisted during filling, during overfilling, during complete filling or during partial filling of the cavity of the injection mould. By means of the assisted flow of the thermoplastic moulding compound along the trajectory, likewise an orientation of the reinforcing fibres which are present in a dispersed state within the thermoplastic moulding compound is hence effected along the trajectory of the variotherm heatable channel. Hence specific adjustment of the orientation of the reinforcing fibres along the trajectory of the variotherm heatable channel or channels extending along the trajectory can be effected.

BRIEF DESCRIPTION OF THE DRAWINGS

FIG. 1 illustrates an injection-moulded component of a rectangular design and the stress distribution occurring in the component if a force F is applied to the longitudinal direction on the component. The component is thereby fixed on one side.

FIG. 7 illustrates the injection mould identical to that is depicted in FIG. 6, with the volume of the cavity of the injection mould subdivided into a grid. The variotherm channel VK is illustrated in a dark colour in comparison with the remaining region of the injection mould.

FIG. 8 illustrates in detail the individual volume elements used for the grid illustrated in FIG. 7.

FIGS. 10A and 10B illustrate the temperature profiles which occur within the thermoplastic moulding compound during the injection moulding process. FIG. 10A illustrates different sectional profiles, which are present immediately after complete filling of the injection mould or during overfilling of the injection mould. FIG. 10B illustrates an envelope on which the temperature of the thermoplastic moulding compound in the chosen example is still 305° C.

FIG. 11A illustrates the speed profile of an injection mould without a variotherm heatable channel. FIG. 11B illustrates the situation which arises with partial overfilling of the injection mould.

FIG. 14 illustrates reproduction of the fibre distribution which occurs during the method of the invention.

FIGS. 15A and 15B illustrate the test results of a simulation test on components which were produced above according to the state of the art (FIG. 15A) and also were produced according to the present invention (FIG. 15B).

DETAILED DESCRIPTION OF THE INVENTION

Figure 2:
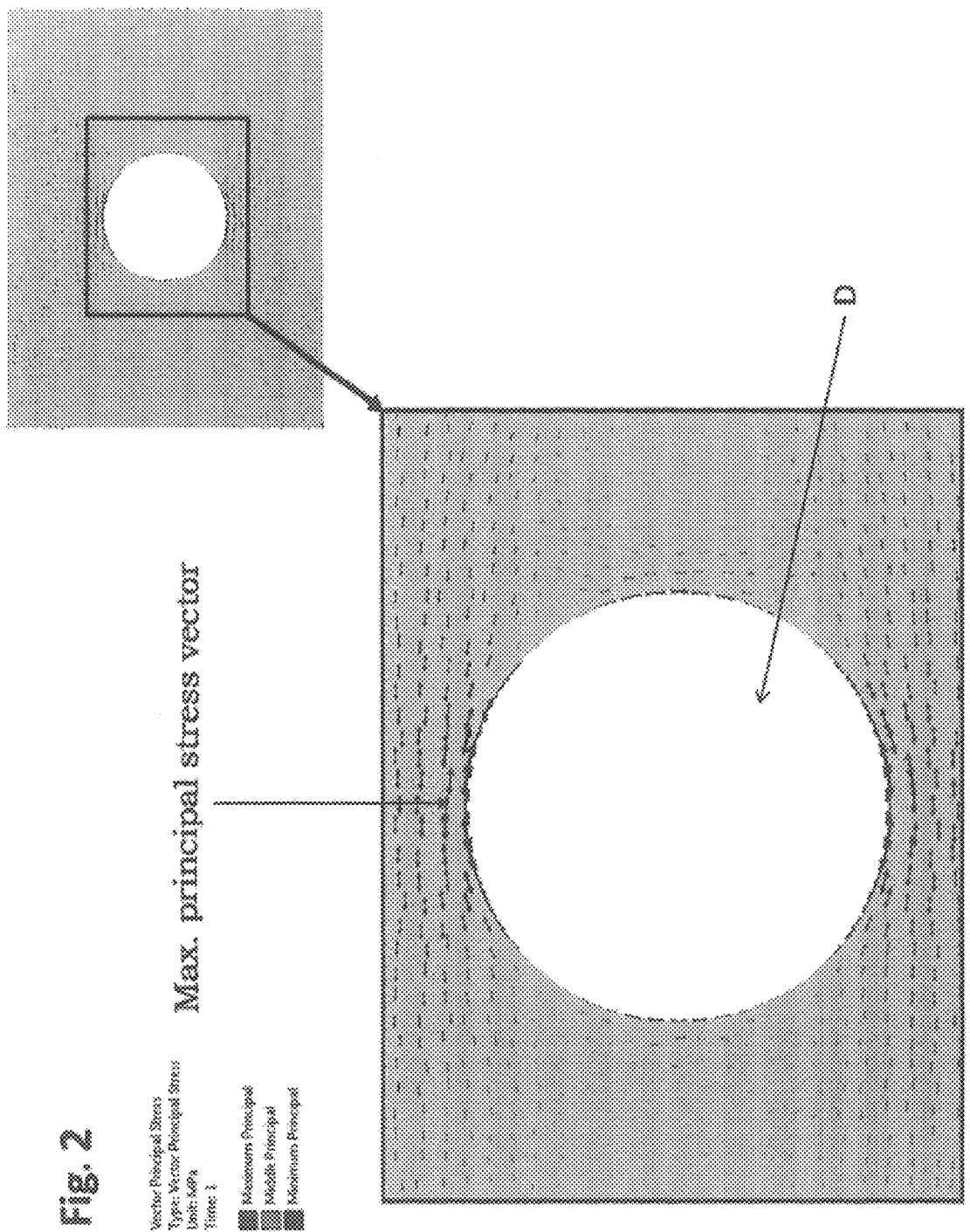
FIG. 2 illustrates the vectorial stress distribution of the component of FIG. 1, and the stress prevailing at the illustrated location.

A preferred embodiment of a method according to the invention provides that the injection mould has at least one overflow opening. When overfilling the injection mould, the excess thermoplastic moulding compound thereby emerges via the overflow opening from the cavity of the injection mould. Preferably, an overflow cavity is connected to the overflow opening, which overflow cavity is in fluidic communication respectively with an overflow opening and, via the overflow opening, with the cavity of the injection mould. The overflow cavity thereby serves for collecting the excess volume of thermoplastic moulding compound which emerges from the overflow opening during overfilling of the injection mould. The collected volume of the thermoplastic moulding compound can be recycled and used again during the method according to the present invention. It is hereby preferred in particular if the at least one variotherm heatable channel begins at the gate location of the injection mould and is guided up to at least one overflow opening so that the thermoplastic moulding compound, in the case of overfilling of the injection mould, can emerge out of the cavity of the injection mould and can enter into the respective overflow cavity via the at least one overflow opening.

With respect to the injection moulding method according to the invention with overfilling of the injection mould, the following temperature controls for the phases, filling of the injection mould (a), overfilling (c) and the phase between filling and overfilling (b), which can be designed as waiting phase, during which no further moulding compound is fed into the injection mould, are preferred:

(1) Constant temperature control: the temperatures $\vartheta_W$ and $\vartheta_{VT}$ remain unchanged during phases (a) to (c), the relation $\vartheta_W < \vartheta_{VT}$ always applying. $\vartheta_W$ is at a low temperature level whilst $\vartheta_{VT}$ is at a high temperature level.

(2) Heating of the variotherm channel: $\vartheta_W$ is constant at a low temperature level during phases (a) to (c). In phase (a), $\vartheta_W$ and $\vartheta_{VT}$ differ preferably by less than 50 K and in particular $\vartheta_W = \vartheta_{VT}$ applies. $\vartheta_{VT}$ is brought to the high temperature level in phase (b) so that, for phases (b) and (c), $\vartheta_W < \vartheta_{VT}$ applies.

(3) Cooling of the remaining mould wall: this alternative is characterised in that $\vartheta_{VT}$ is kept constant at a high temperature level during phases (a) to (c) and $\vartheta_W$ has a high temperature level in phase (a). In phase (a), $\vartheta_W$ and $\vartheta_{VT}$ have similar temperatures which are preferably less than 50 K apart, in particular $\vartheta_W = \vartheta_{VT}$ applying. The temperature $\vartheta_W$ is lowered to a low temperature level in phase (b) so that, for phase (b) and (c), $\vartheta_W < \vartheta_{VT}$ applies.

The relation of the temperatures $\vartheta_W$ and $\vartheta_{VT}$ in phase (c) is identical for the previously mentioned temperature controls (1) to (3) in as much as $\vartheta_W < \vartheta_{VT}$ always applies and also $\vartheta_{VT}$ is always at a high temperature level and $\vartheta_W$ always at a low temperature level. High temperature level hereby means that the moulding compound is and remains flowable in this temperature range, even if it is kept in this state over a fairly long period of time. Low temperature level means that the moulding compound is present not very or not flowable in this temperature range, i.e. either highly viscous or solidified.

The temperature $\vartheta_{VT}$ is lowered after conclusion of phase (c) so that the moulded part can be released from the mould.

The constant temperature control (1) which makes heating of the variotherm channel or cooling of the remaining mould wall superfluous within phases (a) to (c), as a result of which phase (b) can be dispensed with or kept very brief, is particularly preferred.

According to this preferred embodiment in which overfilling of the injection mould is undertaken, it is advantageous if at least one of the following measures is adopted:

5 to 100% by volume, preferably 10 to 70% by volume and particularly preferably 15 to 50% by volume, of the volume of the cavity of the injection mould is overfilled; the volume of the overflow cavity thereby corresponds preferably to the volume proportion of the cavity which is overfilled. If therefore for example 100% by volume of the volume of the cavity of the injection mould is overfilled, this means that in total twice the volume of the cavity is injected into the tool including the overflow cavity during the injection-moulding cycle.

after complete filling, a waiting time of 2 to 60 s is maintained before overfilling is commenced, during which preferably the temperature $\vartheta_{VT}$ in the region of the injection mould which has the at least one variotherm channel of the wall is raised and/or the temperature $\vartheta_W$ in the remaining region of the wall of the injection mould is lowered and/or the overfilling lasts over a time span of 2 to 60 s.

For example, adjustment of the temperature difference can be effected by heating of the variotherm channels of the injection mould being effected exclusively, whilst the remaining regions of the injection mould are not heated.

During the above-mentioned waiting time, no further supply of thermoplastic moulding compound into the cavity thereby takes place, this is undertaken only after conclusion of the waiting time. This further supply can hence be equated with the dwell pressure phase in a conventional injection-moulding cycle. During the waiting time, the temperature-control in the region of the variotherm heatable channel or the variotherm heatable channels is thereby preferably maintained. Optionally, cooling can be undertaken in the remaining region of the wall of the cavity. It is hence ensured that the thermoplastic moulding compound in the cavity of the injection mould thereby remains flowable and thermoplastically processible, whereas the thermoplastic moulding compound in the remaining region of the cavity of the injection mould is possibly already cooled and is very or completely solidified. During dwell pressures, a flow of thermoplastic moulding compound is hence preferably effected, even if not exclusively, in the region of the trajectory of the variotherm heatable channel or channels, as a result of which specific orientation of the reinforcing fibres contained in the thermoplastic moulding compound along the flow, i.e. along the trajectory, is effected.

It is a particular advantage of the method according to the invention that, because of the temperature difference in the region of the at least one variotherm heatable channel and in the remaining regions of the injection mould, adjustment of the orientation of the reinforcing fibres in the thermoplastic moulding compound is effected, an essentially anisotropic orientation of the reinforcing fibres along the trajectory of the at least one variotherm heatable channel being achieved.

In particular, it is hereby the case that the orientation of the reinforcing fibres is defined by an orientation tensor $(a_{ij})$ of a group of n reinforcing fibres contained in one finite volume element, with $$(a_{ij}) = \begin{pmatrix} a_{11} & a_{12} & a_{13} \\ \dots & a_{22} & a_{23} \\ \dots & \dots & a_{33} \end{pmatrix}$$

the elements $a_{ij}$ of which are defined as follows $$a_{ij} = \frac{1}{n}\sum_{k=1}^{n} a_{ij}^k = \frac{1}{n}\left(\sum_{k=1}^{n} p_i^k p_j^k\right)$$

the orientation of the fibres being determined by the diagonal elements $a_{11}$, $a_{22}$ and $a_{33}$ of the orientation tensor $(a_{ij})$, $p_i^k$ or $p_j^k$ respectively representing the components of a vector $\vec{p}^k$ of length 1 which extends parallel to the $k^{th}$ fibre, there applying $$\vec{p}^k = \begin{pmatrix} p_1^k \\ p_2^k \\ p_3^k \end{pmatrix}$$

the vector $\vec{p}^k$ being indicated in each considered finite volume element of the region of the at least one variotherm heatable channel respectively in a local coordinate system, in which the x-axis in the respective considered finite volume element is fixed respectively tangentially to the trajectory of the at least one variotherm heatable channel, the y-axis is orientated perpendicular to x the z-axis is orientated perpendicular to x and y, an essentially anisotropic orientation then being produced if the value of the element all of the orientation tensor ($a_{ij}$) in each given finite volume element is at least 0.5, preferably 0.5 to 0.98, further preferably 0.6 to 0.95, further preferably 0.65 to 0.9, in particular 0.7 to 0.85.

The anisotropic orientation of the fibres can hence be determined by a representative group of n reinforcing fibres being determined with respect to their orientation. A separate vector is thereby established for that fibre, the respective vector thereby extends parallel to the respective considered fibre. The finite volume element can thereby be chosen for example as a cube with defined edge length which is of a smaller dimension than the extension of the region of the variotherm heatable channel. Generally, for example the resolution determined by means of a spectroscopic photograph can be used for measuring the finite volume element. Those fibres which are disposed entirely within the considered finite volume element are thereby included in the group of n reinforcing fibres, but also those fibres which are cut by the defining surfaces of the respective finite volume element and hence are only partially within the finite volume element. This finite volume element can be for example a voxel with an edge length in the range of 10 μm.

For the anisotropic orientation, merely the orientation relative to the x-component of the respective local coordinate system is thereby relevant. For this reason, the above-indicated definition of the y- or z-component of the respective coordinate system is not necessarily provided. Merely for the purposes of clarity, for example the respective y-component of the coordinate system can be regarded as orthogonal to the wall of the cavity of the injection mould.

The anisotropy is thereby configured over the entire region of the variotherm heatable channel or of the variotherm heatable channels, i.e. fulfilled at any location of the region of the variotherm heatable channel.

Thereby excluded from this definition are the regions at which for example branching of a variotherm heatable channel into a plurality of heatable channels or joining of a plurality of variotherm heatable channels to form a single variotherm heatable channel is effected. At these places or in these regions, because of the different orientation caused by a plurality of variotherm heatable channels, of course no preferential orientation of the reinforcing fibres can be established.

The region of the variotherm heatable channel or of the variotherm heatable channels in the finished moulded part corresponds to the region which is enclosed by dropping a perpendicular along the delimitations of the variotherm heatable channel relative to the wall of the cavity in the moulded part.

The three-dimensional determination of the orientation of reinforcing fibres, such as e.g. glass fibres, is known from the state of the art and described for example in the article "Pipeline zur dreidimensionalen Auswertung and Visualisierung der Faserverteilung in glasfaserverstärkten Kunststoffteilen aus-Röntgen-Computertomografiedaten" (Pipeline for Three-Dimensional Evaluation and Visualisation of the Fibre Distribution in Glass Fibre-Reinforced Plastic Material Parts from X-Ray Computer Tomography Data), J. Kastner et al., DACH annual conference 2008 in St. Gallen—Di.3.A.1. The fibre orientation is hereby determined by means of voxels with a size of 8.6 μm. Determination of the fibre distribution by means of computer tomography and also determination of the orientation tensor can also be undertaken according to the present invention with reference to the explanations of this article.

The method according to the invention, in particular with respect to phase (c), can thereby be implemented preferably such that at least one of the following conditions is fulfilled:

$\vartheta_{VT} > \vartheta_G$ or $\vartheta_{VT} > \vartheta_K$, preferably $\vartheta_{VT} - \vartheta_G \leq 10$ K or $\vartheta_{VT} - \vartheta_K \leq 10$ K, $\vartheta_G$ meaning the glass transition temperature of amorphous thermoplastic moulding compounds and $\vartheta_K$ the crystallisation temperature of partially crystalline thermoplastic moulding compounds, $\vartheta_{VT}$ is in the range of $\vartheta_{FM} \pm 40$ K and/or $\vartheta_{VT} - \vartheta_W \leq 50$ K, preferably $\vartheta_{VT} - \vartheta_W \geq 100$ K.

$\vartheta_{FM}$ is the temperature of the moulding compound when entering into the cavity of the injection mould.

The thermal behaviour (melting point ($\vartheta_{FM}$), melt enthalpy (ΔHm), crystallisation temperature ($\vartheta_K$) and glass transition temperature ($\vartheta_G$)) were determined with reference to the ISO standard 11357 on the granulate.

Differential scanning calorimetry (DSC) was implemented with a heating/cooling rate of 20° C./min.

The at least one variotherm heatable channel can thereby be configured on one or both sides in the cavity of the injection mould. For the injection moulding method, possibly an injection mould which is formed from at least two partial moulds is used which, when joined, reflect a cavity and hence the outer shape of the moulded part to be produced. According to this preferred embodiment, it is hence provided that at least one variotherm channel is introduced in each of the cavities or configured there. In a preferred embodiment, the variotherm heatable channels which are present on both sides in the respective wall of the injection mould are thereby disposed such that they extend congruent to each other in projection onto the respective surface. In the case of such an embodiment, the same volume region is temperature-controlled within the injection mould by the variotherm heatable channels disposed on both sides of the wall.

According to a further preferred embodiment, the sum of the area of the at least one variotherm heatable channel (i.e. the entire surface area of the area which can be temperature-controlled on the surface of the cavity by the variotherm heatable channel or channels) constitutes 1 to 50%, preferably 3 to 30%, particularly preferably 4 to 20%, in particular 5 to 10%, of the inner surface of the cavity of the injection mould.

For example, the at least one variotherm heatable channel can be configured as a variotherm heatable strip, preferably with a constant width, the width being preferably 0.2 to 30 mm, preferably 0.5 to 10 mm. The present invention is however not limited hereto.

One possible embodiment of the present invention provides that the injection mould has at least one breakthrough. This breakthrough causes a gap in the moulded part which is to be produced, i.e. the finished moulded part, at the place at which the injection mould has the breakthrough thereof, has a hole. This breakthrough is not restricted with respect to the geometry thereof and can have for example a round, oval, n-angled configuration, n being a natural integral number from 3 or more.

In this embodiment in which the injection mould has at least one breakthrough, it is advantageous if at least one variotherm heatable channel is configured in a way extending completely or at least in regions circumferentially about the at least one breakthrough, respectively one variotherm heatable channel which surrounds the respective breakthrough is configured preferably about each breakthrough on one or both sides of the cavity in the wall of the injection mould.

According to this embodiment, it is hence preferred if for example one variotherm heatable channel is configured about the breakthrough, the breakthrough is hence entirely enclosed by a corresponding variotherm heatable channel.

It is hereby preferred that the at least one variotherm channel, which is configured in a way extending completely or at least in regions circumferentially about the at least one breakthrough, has at least one continuation in an inflow direction and at least one continuation in an outflow direction, preferably the continuation in the inflow direction being continued up to the gate location of the injection mould and/or the continuation in the outflow direction being continued up to the at least one overflow opening. It is provided in this embodiment that the variotherm heatable channel which encloses the breakthrough has respectively two continuations, one in the inflow direction—this corresponds to the principal flow direction of the thermoplastic moulding compound during the injection moulding process towards the breakthrough—or in the outflow direction—this corresponds to the flow of the thermoplastic moulding compound after flowing about the breakthrough. The respective continuations of this variotherm heatable channel about the breakthrough are likewise configured as variotherm heatable regions. The variotherm heatable channel is composed in this case of the region about the breakthrough and also the continuations.

Viewed from a continuation, branching of the variotherm heatable channel is hence effected in a region which is formed about a corresponding breakthrough. At another place, the two partial arms of the variotherm heatable channel open—in turn—into a continuation in the outflow direction.

It is hereby preferred in particular if the continuation in the inflow direction and the continuation in the outflow direction are disposed offset relative to each other in projection of the breakthrough, preferably are disposed offset relative to each other by at least 120°, in particular are disposed offset relative to each other by 180°±10°. The range 180°±10° thereby encloses any angle which is within this region, in particular also precisely 180°.

In the case where the moulded part to be produced has a principal tensile load direction in use, i.e. a direction in which the moulded part is under tension and/or tensile load permanently or at least at times during use, it is particularly advantageous that respectively the continuation in the inflow direction and the continuation in the outflow direction have a direction, independently of each other in projection of the breakthrough, which deviates by at most 60°, preferably at most 50°, further preferably at most 40°, in particular at most 30°, from the principal tensile load direction. Particularly preferably, this condition applies both for the inflow and the outflow. As a result, it can be achieved that the reinforcing fibres in the region of the breakthrough are orientated essentially, i.e. for the most part, in the direction of the principal tensile load direction, i.e. an anisotropic distribution in the direction of the principal tensile load direction can be achieved according to the above-indicated definition. An orientation of the reinforcing fibres transversely relative to the principal tensile load direction can hence essentially be prevented in the region of the location of the variotherm channel or the variotherm channels. In such an embodiment, a significant reinforcement of the moulded part in the direction of the principal tensile load direction, compared with moulded parts which result from a conventional injection moulding process, can hence be achieved.

The thermoplastic moulding compound which can be used according to the method according to the invention is thereby preferably formed from at least one thermoplastic matrix polymer or a mixture of at least two thermoplastic matrix polymers in which the reinforcing fibres are present in a dispersed state. The thermoplastic moulding compound can of course also comprise conventional additives which are contained in thermoplastic moulding compounds, such as for example the conventional additives, flame-retardants, shaping aids etc. The matrix polymer is thereby selected preferably from the group consisting of polyamides, including polyamide imide, polyether amide and polyester amide; polycarbonates; polyolefins, in particular polyethylene, polypropylene and polystyrene or polyvinyl chloride (PVC); polyacrylates, in particular polyacrylic acid esters, such as e.g. polymethyl(meth)acrylate; acrylonitrile-butadiene-styrene copolymer, acrylonitrile-styrene copolymer; polyesters, in particular polyethylene terephthalate, polybutylene terephthalate or polycyclohexylene terephthalate, polysulphones (in particular of the PSU, PESU, PPSU type), polyphenylene sulphide; polyethers, in particular polyoxymethylene, polyphenylene ether and polyphenylene oxide, liquid-crystalline polymers; polyether ketones; polyether ether ketones; polyimides; polyester imides, polyether ester amides; polyurethanes, in particular of the TPU or PUR type; polysiloxanes; celluloid and also mixtures or combinations hereof.

Preferred reinforcing fibres are preferably selected from the group consisting of glass fibres, carbon fibres (carbon fibres, graphite fibres), aramide fibres and whiskers. Preferably glass fibres and carbon fibres are used.

The reinforcing fibres, in particular the glass fibres, are preferably incorporated in the moulding compound in the form of endless strands or in cut form, in particular in the form of short fibres, such as e.g. short glass fibres (cut glass).

In the case of short fibres, in particular short glass fibres, these fibres added to the moulding compound have a preferred length of 0.2 mm to 20 mm preferably of 1 to 6 mm, in particular of 2.5 mm.

Preferably, the reinforcing fibres are equipped with a size and/or an adhesive.

In general, the glass fibres can have a circular cross-section or a non-circular cross-section, also mixtures of such systems being able to be used.

Preferably, in the case of round glass fibres those with a diameter of 5 to 20 µm, preferably of 6 to 15 µm and particularly preferably of 7 to 12 µm, are used.

Preferably, in the case of flat fibres, those which have a ratio of the cross-sectional axes (principal cross-sectional axis relative to the subsidiary cross-sectional axis which are perpendicular to each other) of greater than or equal to 2, in particular in the range of 2.8-4.5, and the smaller cross-sectional axis thereof has a length≥4 µm.

The glass fibres thereby consist preferably of E-glass. However all other sorts of glass fibres can be used, such as e.g. A-, C-, D-, M-, S-, R-glass fibres or any mixtures thereof or mixtures with E-glass fibres. The glass fibres can thereby be added as endless fibres or as cut glass fibres, the fibres being able to be equipped with a suitable sizing system and an adhesive or an adhesive system, e.g. based on silane, aminosilane or epoxysilane.

The glass fibres can be replaced partially or entirely by whiskers. There should be understood by whiskers, needleshaped crystals, in particular monocrystals made of metals, oxides, borides, carbides, nitrides, polytitanate, carbon etc., with generally a polygonal cross-section, e.g. potassium titanate-, aluminium oxide-, silicon carbide whiskers. In general, whiskers have a diameter of 0.1 to 10 µm and a length in the mm- to cm range. At the same time, they have high tensile strength. Whiskers can be produced by deposition from the vapour phase on the solid body (VS mechanism) or from a three-phase system (VLS mechanism).

The moulding compounds which are used for the injection moulding method according to the invention can comprise, alone or together with other reinforcing fibres, also carbon fibres. Carbon fibres are industrially produced reinforcing fibres made from carbon-containing starting materials which are converted by pyrolysis (oxidation and carbonisation) into carbon with a graphite-like arrangement. Anisotropic carbon fibres display high strengths and rigidities with at the same time low breaking elongation in the axial direction.

The carbon fibres are preferably used as carbon fibre bundles, consisting of several hundred to a hundred thousand carbon fibres, so-called individual filaments, which have a diameter of 5 to 9 µm, a tensile strength of 1,000 to 7,000 MPa and a modulus of elasticity of 200 to 700 GPa. Normally, 1,000 to 24,000 individual filaments are combined to form a multifilament yarn (endless carbon fibre bundle, roving) which is wound up. Further processing to form textile semifinished products, such as e.g. woven fabrics, plaited fabrics or multiaxial fabrics, is effected on looms, plaiting machines or multiaxial knitting machines or, in the field of production of fibre-reinforced plastic materials, directly on prepreg units, strand-drawing units (pultrusion units) or winding machines. As short cut fibres, the carbon fibres can also be mixed directly with polymers or moulding compounds and can be processed to form plastic material components via extruder- and injection moulding units.

The weight proportion of the reinforcing fibres in the thermoplastic moulding compound is thereby preferably 5 to 80% by weight, preferably 20 to 70% by weight and particularly preferably 25 to 65% by weight.

The thermoplastic moulding compound can be formed from the above-mentioned components, likewise possible are also conventional additives, such as e.g. particulate fillers and pigments, stabilisers (heat- and light stabilisers, antioxidants), UV absorbers, UV blockers, processing aids, impact modifiers, adhesives, crystallisation promoters or -retardants, flow aids, lubricants, mould-release agents, plasticisers, radical collectors, antistatic agents, flame-retardants, colourants and marking materials, nanoparticles in plate form, layer silicates, conductivity additives, such as carbon black, graphite powder or carbon nanofibrils, additives for improving the heat conductivity, such as e.g. boron nitride, aluminium nitride.

Particulate fillers are preferably, for example talc, mica, silicate, quartz, titanium dioxide, wollastonite, kaolin, amorphous silicic acids, magnesium carbonate, magnesium hydroxide, chalk, lime, feldspar, solid or hollow glass balls or ground glass, glass flakes, permanently magnetic or magnetisable metal compounds and/or alloys, pigments, in particular barium sulphate, titanium dioxide, zinc oxide, zinc sulphide, iron oxide, copper chromite, or are selected from mixtures thereof. The fillers can also be surface-treated.

The moulding compounds used preferably in the injection moulding method according to the invention have a melt viscosity in the case of typical procedural shear rates (shear viscosity) of 100 to 10,000 s$^{-1}$, in particular at 1,000 to 10,000 s$^{-1}$, measured according to ISO 11443, preferably in the range of 10 to 10,000 Pas, particularly preferably in the range of 20 to 3,000 Pas and very particularly preferably in the range of 30 to 1,000 Pas. The temperature underlying the determination of the melt viscosity thereby corresponds to the typical measuring temperature for this moulding compound, with respect to the MVR determination (melt volume flow rate) according to ISO 1133, as is indicated in the data sheets of the manufacturers. If this is not available, a measuring temperature is chosen which is 5 to 100° C., preferably 10 to 40° C., above the melt temperature (partially crystalline plastic material matrix) or above the glass transition temperature (amorphous plastic material matrix) of the moulding compound. For example, a polyamide moulding compound filled with 30 to 60% by weight of glass fibres with PA 6T/6I (70:30) at 335 to 355° C. can be measured.

Hence during overfilling, filling or partial filling of the injection mould, the melt viscosity of the thermoplastic moulding compound at the injection location into the cavity of the injection mould can be adjusted by choice of $\vartheta_{FM}$, preferably to 10 to 8,000 Pas, preferably 50 to 5,000 Pas. Preferably, the pressure with which the thermoplastic moulding compound is injected into the cavity of the injection mould is between 50 to 2,000 bar.

In addition, the present invention relates to a moulded part which is formed from a thermoplastic moulding compound filled with reinforcing fibres. The moulded part can thereby be produced according to the above method. The moulded part according to the invention is distinguished by the reinforcing fibres having, in the regions which were produced during the production method with the regions of the injection mould in which the at least one variotherm heatable channel was configured, an essentially anisotropic orientation of the reinforcing fibres along the trajectory of the at least one variotherm heatable channel.

As a result, a significantly increased tensile strength of the component is achieved, compared with otherwise identical components which were produced by means of conventional injection moulding (i.e. without variotherm heating in the above-mentioned sense) with the same gate location.

The orientation of the reinforcing fibres is thereby defined by an orientation tensor (a) of a group of n reinforcing fibres contained in one finite volume element, with $$(a_{ij}) = \begin{pmatrix} a_{11} & a_{12} & a_{13} \\ \ldots & a_{22} & a_{23} \\ \ldots & \ldots & a_{33} \end{pmatrix}$$

the elements $a_{ij}$ of which are defined as follows $$a_{ij} = \frac{1}{n}\sum_{k=1}^{n} a_{ij}^{k} = \frac{1}{n}\left(\sum_{k=1}^{n} p_{i}^{k} p_{j}^{k}\right)$$

the orientation of the fibres being determined by the diagonal elements $a_{11}$, $a_{22}$ and $a_{33}$ of the orientation tensor $(a_{ij})$, $p_i^k$ or $p_j^k$ respectively representing the components of a vector $\vec{p}^k$ of length 1 which extends parallel to the $k^{th}$ fibre, there applying $$\vec{p^k} = \begin{pmatrix} p_1^k \\ p_2^k \\ p_3^k \end{pmatrix}$$

the vector $\vec{p^k}$ being indicated in each observed finite volume element of the region temperature-controlled by the at least variotherm heatable channel respectively in a local coordinate system, in which
  the x-axis in the respective considered finite volume element is fixed respectively tangentially relative to the trajectory of the at least one variotherm heatable channel,
  the y-axis is orientated perpendicular to x and
  the z-axis is orientated perpendicular to x and y,
an essentially anisotropic orientation then being produced if the value of the element $a_{11}$ of the orientation tensor $(a_{ij})$ in each given finite volume element is at least 0.5, preferably 0.5 to 0.98, further preferably 0.6 to 0.95, further preferably 0.65 to 0.9, in particular 0.7 to 0.85.

With respect to the further definitions of n or the further standard coordinates y and z, reference is made to the above-given explanations.

In particular, the moulded part according to the invention is selected from the group consisting of structural components with high mechanical requirements and functional parts with a high dimensional accuracy requirement.

The invention relates in addition to an injection mould for the production of moulded parts made of thermoplastic moulding compounds comprising reinforcing fibres by means of injection moulding, comprising at least two partial moulds which enclose a cavity reproducing an outer geometric configuration of a moulded part to be produced, at least one inlet for filling the cavity with a thermoplastic moulding compound (gate location) comprising reinforcing fibres found in the plasticised state being provided in at least one of the partial moulds, and, in one or all partial moulds, at least one variotherm heatable channel being configured in the wall of the partial mould or moulds defining the cavity. The injection mould according to the invention can be used in particular in the previously described method according to the invention for the production of moulded parts by means of injection moulding. All of the explanations there with respect to the specific configuration of the injection mould, in particular of the at least variotherm heatable channel, apply of course likewise for the injection mould presented according to the invention.

A preferred embodiment of the injection mould provides that all of the partial moulds have at least one breakthrough which causes a gap in the moulded part which is to be produced, at least one variotherm heatable channel being configured in a way extending completely or at least in regions circumferentially about the at least one breakthrough, and having a continuation in an inflow direction and a continuation in an outflow direction, and preferably the continuation in the inflow direction and the continuation in the outflow direction being disposed offset relative to each other in projection of the breakthrough, preferably being disposed offset relative to each other by at least 120°, in particular being disposed offset relative to each other by 180°±10°. The range 180°±10° thereby includes any angle which is within this range, in particular also precisely 180°.

Further preferably, it is provided that the moulded part to be produced has a principal tensile load direction during use, the continuation in the inflow direction and the continuation in the outflow direction having, in projection of the breakthrough, respectively a direction which deviates from the principal tensile load direction by at most 60°, preferably at most 50°, further preferably at most 40°, in particular at most 30°.

Preferably, the injection mould has at least one overflow opening which is in fluidic communication with the cavity, into which, in the case of overfilling of the injection mould, thermoplastic moulding compound can flow out of the cavity, the overflow opening, further preferably, respectively opening into an overflow cavity.

According to a further preferred embodiment, the at least one variotherm heatable channel begins at the gate location of the injection mould and preferably ends at the at least one overflow opening.

The previously described continuation is preferably configured up to the gate location of the injection mould; alternatively or additionally hereto, it is likewise possible that the continuation is continued in the outflow direction up to the overflow opening.

According to a further preferred embodiment, the sum of the area of the at least one variotherm heatable channel constitutes 1 to 50%, preferably 3 to 30%, particularly preferably 4 to 20%, in particular 5 to 10%, of the inner surface of the cavity of the injection mould.

Alternatively or additionally hereto, it is likewise preferred that the at least one variotherm heatable channel is configured as a variotherm heatable strip, preferably with a constant width, the width being preferably 0.2 to 30 mm, preferably 0.5 to 10 mm.

It is further advantageous that the injection mould according to the invention has a cooling unit, by means of which the wall defining the cavity of the injection mould can be cooled. By means of this cooling unit, in particular the entire wall of the cavity of the injection mould can be cooled so that the cooling and solidification of the thermoplastic moulding compound situated in the cavity and hence in total the final forming process can be significantly accelerated.

The present invention is explained in more detail with reference to the subsequent embodiments without however wishing to restrict the invention to the examples.

The method according to the invention makes it possible to influence the orientation of the fibres within a moulded part and essentially to design this anisotropically within specific regions.

With the method according to the invention, the moulded part can be designed—given the same position of the gate location—such that the principal fibre orientation (tensor of the fibre orientation x-direction) coincides with the maximum principal stress vector (intended loading of the moulding part in x-direction) in all mechanically relevant regions. According to the invention, the fibre orientation coincides over the entire thickness of the test piece at least up to 50%, preferably at least up to 60% and particularly preferably up to at least 65 or even up to 70%, with the direction of the principal stress axis (X-X). In the case of conventional injection moulding, and a similar gate location, the tensor of the fibre orientation is situated in the centre over the thickness of the test piece at at most 35% in the direction of the principal stress vector. Only in the edge regions is an orientation of somewhat above 40% in the direction of the principal stress vector achieved.

If, in the majority of cases, the fibre orientation deviates from the principal stress axis, as is the case with conventional injection moulding, the potential, with respect to the material strength, cannot be fully exploited. This means that failure of the component occurs even at a low stress level.

With the method according to the invention, significantly higher strengths before failure of the moulded part can therefore be achieved, in comparison with conventional injection moulding methods (the same gate location), because the reinforcing fibres at the location of the greatest stress are, in the majority of cases, orientated in the direction of the stress vector. The gain in strength compared with conventional injection moulding is thereby in the range of 40 to 100%, preferably in the range of 50 to 80%.

According to the invention, a mould is used in which at least one mould wall has an additional heatable element which begins at the gate location and continues up to the region of the mould wall in which the fibre orientation is intended to be influenced. This region of the mould wall correlates with the location (or locations) of highest stress(es) in the component if this is subjected to specific application loads. Preferably, the heatable element is continued from this region up to an overflow cavity which abuts against the mould cavity. With respect to the area of the respective mould wall, this additional heating element takes up less than 50%, preferably less than 30% and particularly preferably less than 20%. The width of the heating element is typically between 0.5 and 10 mm and can be constant or variable over the course in the mould wall. In length, the heating element describes a path on the surface of the mould wall which can be freely chosen and preferably extends from the gate up to the overflow cavity. The course of the at least one supplementary heating element in the mould wall should be designed correspondingly to the respective task. This additional heating ensures that, at the end of the pressure retaining phase or filling phase, the plastic material moulding compound in the mould cavity is still flowable in a region above the heating, the so-called variotherm heatable channel, whilst the remaining moulding compound is present already solidified or at least highly viscous.

The variotherm heatable channel still thereby has no great significance at the beginning of the injection, but rather the melt is pressed into the cavity in a manner which cannot in practice be differentiated from conventional injection moulding. Only towards the end of the pressure retaining phase, if the melt is already solidified outside the regions of the variotherm heatable channel, a melt flow flows specifically through the regions of the mould cavity which are heated by the additional heating element in the mould wall and in fact in particular as far as into the overflow cavity. By means of this melt flow, high fibre orientation results along the variotherm heatable channels.

By means of the fibre orientation in the direction of the principal stress axis of the moulded part, which is changed relative to conventional injection moulding methods, the strength until breakage is improved by up to 100%.

Since the method with the variotherm heatable channels requires very local heating and high design freedom, thick-film heating technology is preferably used for heating the channels.

The method for the production of reinforced moulded parts can be effected for example such that a plastic material moulding compound with fibre reinforcement (preferably 20-70% by weight) is injected into a mould cavity, at least one wall of the mould having at least one additional heating element which, in its entire extension, heats less than 50% of the wall area and, projected onto the surface of the mould wall, has the form of a strip of 0.5-10 mm width which extends from the gate location up to the location of the overflow cavity, and the mould, with the exception of the regions with the additional heating element, is temperature-controlled to a temperature below the solidification temperature of the plastic material and this temperature is kept virtually constant during the entire injection-moulding cycle (preferred temperature control (1)), and also the mould regions above the additional heating element are kept at a temperature above the solidification temperature of the plastic material during the injection- and pressure retaining phase so that molten plastic material moulding compound can flow at the end of the pressure retaining phase still inside the variotherm heatable channels and the excess melt is poured into the overflow cavity.

The course of the at least one additional heating element thereby deviates, at least in one region, from the direction of the initial melt flow, i.e. the direction of the melt flow caused by the gate location.

REFERENCES IN THE FIGURES

D: breakthrough in the component
F: force which is applied to the component
K: cavity of the injection mould
A: gate location
WL: joint line
VK: variotherm channel
ÜW: remaining mould wall
F1: inflow; part of the variotherm channel which supplies the plastic material melt to the variotherm channel which is guided in a circle about the breakthrough D
F2: outflow; part of the variotherm channel which receives the plastic material melt from the variotherm channel which is guided in a circle about the breakthrough D and supplies it to the overflow UL
ÜL: overflow
ÜK: overflow cavity
HR: heating channel FIG. 1 shows an injection-moulded component, by way of example, of a rectangular design, which is used, by way of example, for the following tests. The component thereby has a length of 100 mm, a width of 75 mm and also a thickness of 3 mm which protrudes into the image direction. In the centre of this component, a circular breakthrough D which has a diameter of 30 mm is introduced.

FIG. 1 shows the stress distribution occurring in the component if a force F (in the case of the example 10 kN) is applied to the longitudinal direction on the component. The component is thereby fixed on one side (this is the left-hand side in FIG. 1).

It is detectable that the greatest stress forces occur directly at the boring, perpendicular to the tension direction. In particular these places hence predispose possible breaking points within this component.

The vectorial stress distribution on the same component is illustrated also for example in FIG. 2. In FIG. 2, the stress prevailing at the respectively illustrated location is symbolised, with respect to the principal acting component thereof (arrow direction) and also the absolute value thereof (arrow size).

The tests on the component according to FIGS. 1 and 2 (as also in the case of all further tests represented in FIGS. 3 to 15B) were thereby determined by means of a simulation method (finite element method using a moulding compound consisting of a polyamide 6T/6I (molar ratio: 70:30), reinforced with 50% by weight of glass fibres with a round cross-section (cross-sectional diameter: 10 µm, length: 200 µm) which has a melting point of 325° C.

Figure 3:
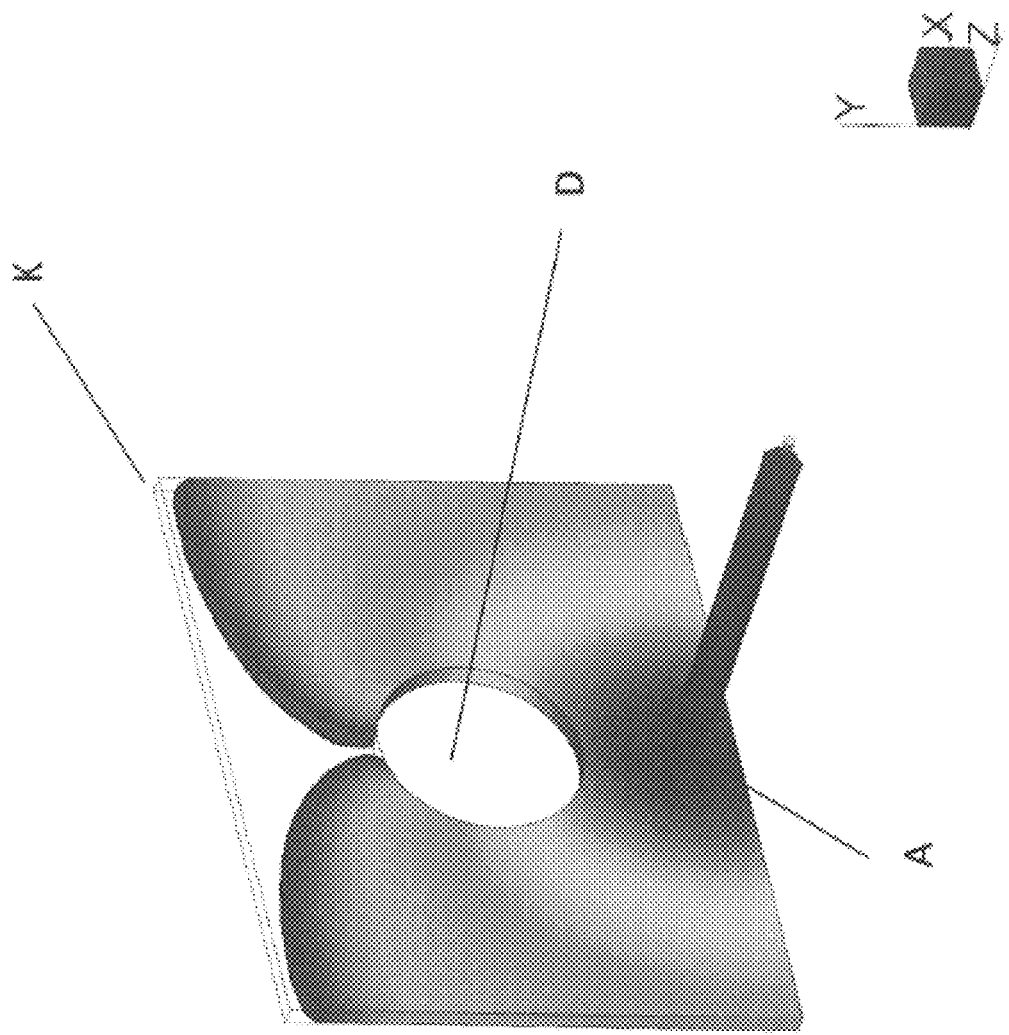
FIG. 3 illustrates schematically an injection moulding method for the production of a moulded part according to FIGS. 1 and 2, as is known from the state of the art.

FIG. 3 illustrates schematically an injection moulding method for the production of a moulded part according to FIGS. 1 and 2, as is known from the state of the art. A cavity K is hereby filled via a gate location A with a thermoplastic moulding compound in the molten state and which comprises for example glass fibres. In FIG. 3, a state is illustrated, in which the cavity K is still not completely filled with the thermoplastic moulding compound and in which the thermoplastic moulding compound has already partially flown from the gate location A about the breakthrough D. The respective flow fronts of the thermoplastic moulding compound have not yet thereby flown together completely about the breakthrough D, the confluence, in the state illustrated in FIG. 3, is however immediately imminent.

Figure 4:
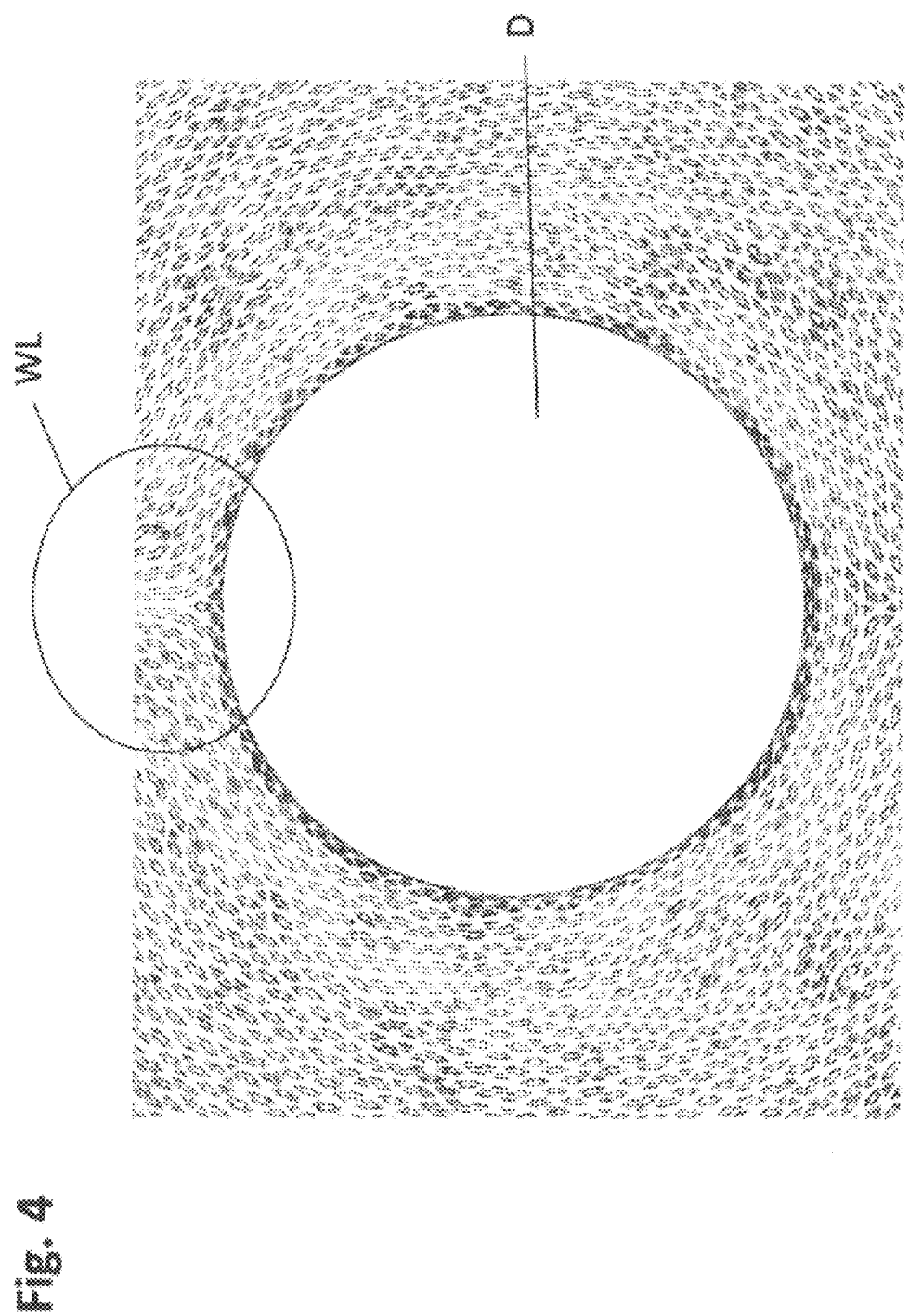
FIG. 4 shows the structure of the end product of the injection moulding process as illustrated in FIG. 3; the orientation of the reinforcing fibres contained in the thermoplastic moulding compound is reproduced.
Figure 5:
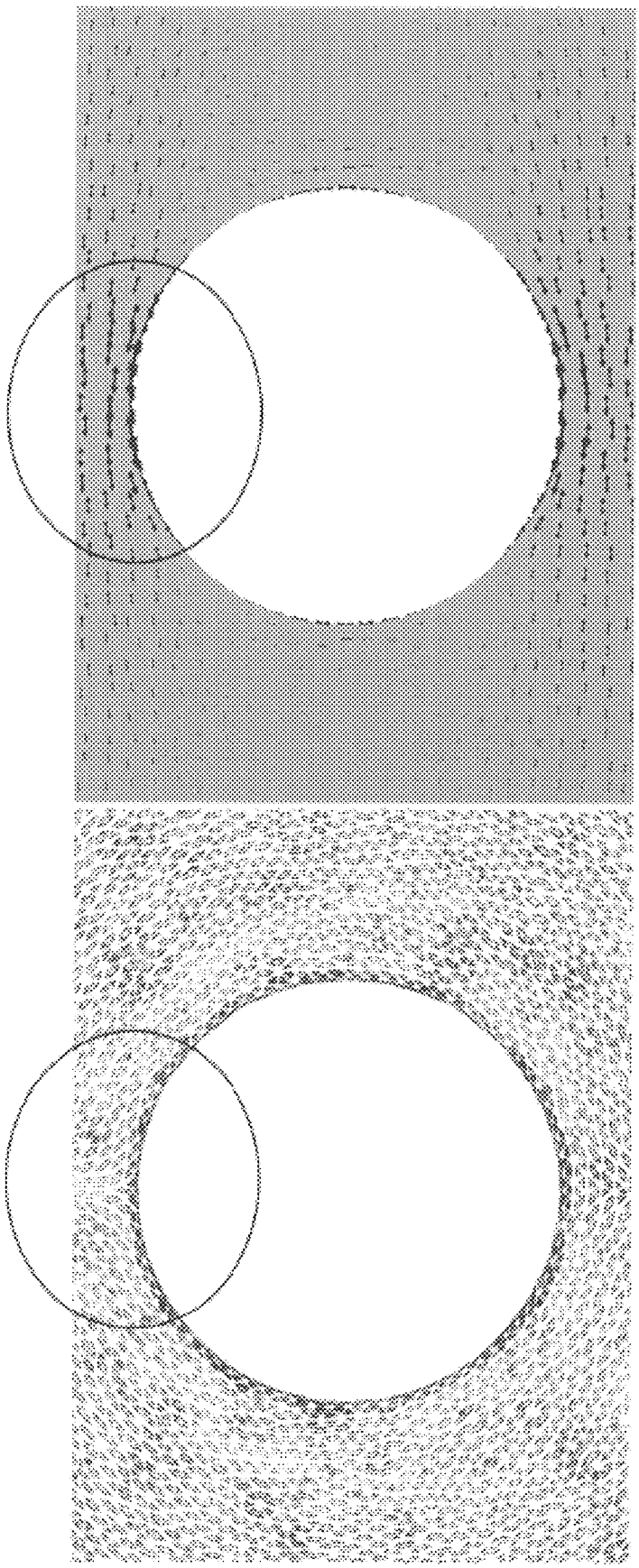
FIG. 5A is a reduced representation of FIG. 4.
FIG. 5B is a reduced representation of the illustration of FIG. 2.

FIG. 4 shows the end product of the injection moulding process illustrated in FIG. 3 (the same section as in FIG. 2). After complete filling of the cavity K of the injection mould, a moulded part is thereby obtained which, in the region in which the two fronts of the thermoplastic moulding compound, illustrated in FIG. 3, produce a joint line WL after flowing together. In FIG. 4, the orientation of the reinforcing fibres contained in the thermoplastic moulding compound is thereby reproduced. It is detectable that the reinforcing fibres (in this case glass fibres) are distributed anisotropically in the region WL and lead away from the breakthrough D. Where the two flow fronts flow together, the glass fibres are orientated parallel to each other.

Such a distribution of the glass fibres within the moulded part is, however, extremely disadvantageous. This is illustrated with reference to the comparison of FIGS. 5A and 5B. Whilst FIG. 5A is the reduced representation of FIG. 4, FIG. 5B corresponds to the reduced illustration of FIG. 2. It is detectable that the resulting fibre distribution in the region of the joint line WL is ineffective for absorbing the greatest possible tensile stress occurring in this region. For this purpose, a fibre distribution along or parallel to the tensile forces would be required. However this is not achievable with a conventional injection moulding method. In the conventional method, an orientation of the glass fibres or reinforcing fibres essentially perpendicular to the tensile stress is produced. The region of the joint line WL is therefore unsuitable for absorbing the occurring tensile forces and hence represents a predetermined breaking point in the obtained moulded part.

Figure 6:
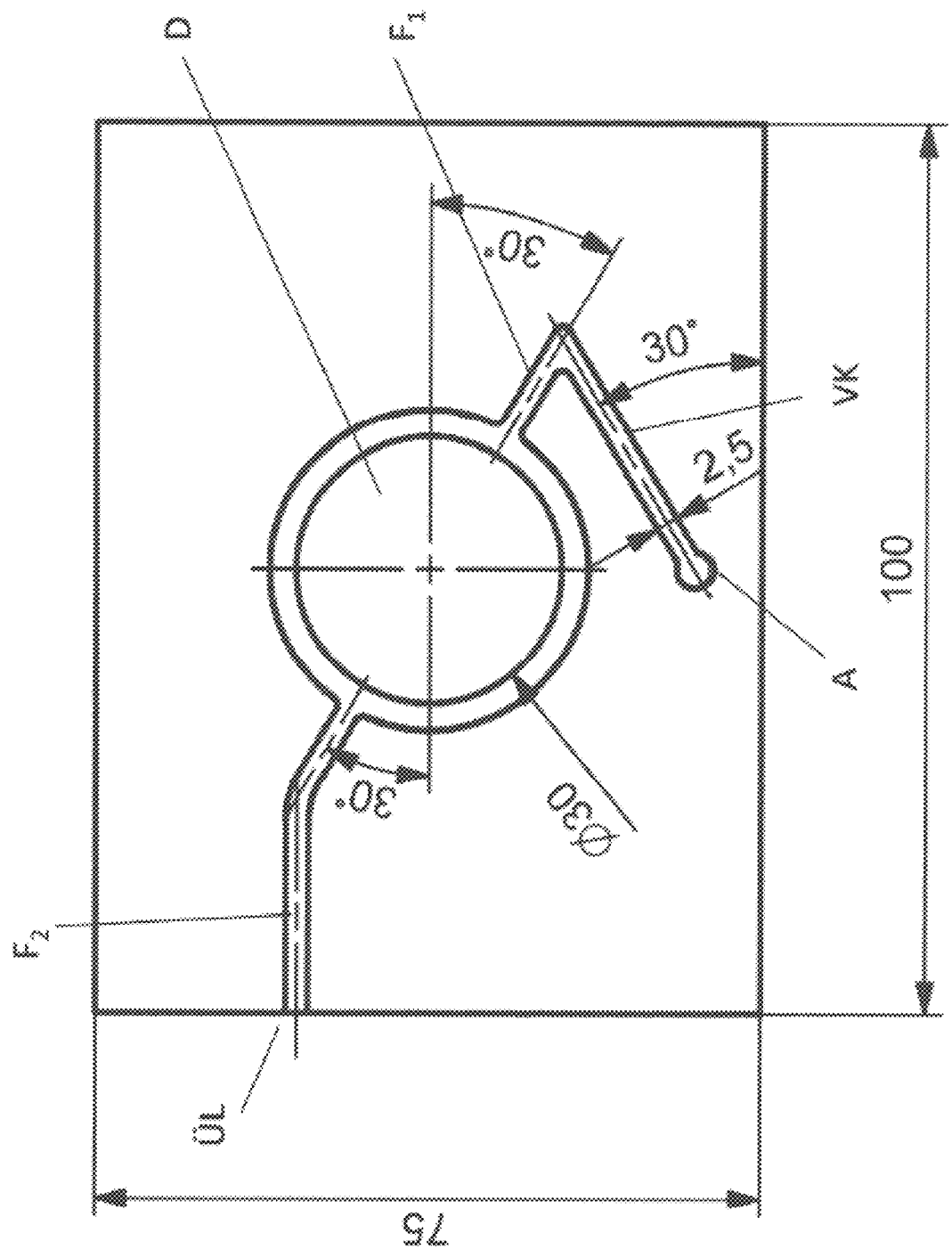
FIG. 6 illustrates schematically an embodiment of an injection mould according to the invention.

In FIG. 6, an embodiment of an injection mould according to the invention is illustrated schematically, with which a specific anisotropic distribution of the reinforcing fibres, for example glass fibres, can be made possible in the component. The injection mould is thereby present with a view on the side of the injection mould (nozzle side) which enables the longitudinal- and broad-side of the moulded component. The depth dimension, i.e. the thickness of the component is thereby illustrated extending downwards in correspondence with the above Figures.

The injection mould thereby has a breakthrough D with which also the gap in the moulded part to be correspondingly produced can be achieved. With such an injection mould, the shape can be produced according to an identical component, as illustrated in FIGS. 1 to 5B.

In at least one of the walls defining the cavity of this injection mould, in this case in both walls, i.e. in the front-side (nozzle side, this is the side on which the gate location is also situated) and rear-side (ejection side), a variotherm heatable channel VK is introduced, with which channel the wall defining the cavity of the injection mould can be heated locally. In the case illustrated in FIG. 6, by way of example, the variotherm heatable channel VK begins at the gate location A via which the cavity can be filled with the thermoplastic moulding compound. The gate location is thereby chosen to be identical to that illustrated in FIG. 3.

The variotherm heatable channel is thereby chosen to be 2.5 mm wide and has the same width over the entire course in the case illustrated in FIG. 6. In FIG. 6, the variotherm heatable channel is guided to the right rising upwards, viewed from the gate location, the angle maintained hereby relative to the longitudinal side of the injection mould is thereby for example 30°. The variotherm heatable channel VK is thereafter deflected into a supply pipe $F_1$, this supply pipe $F_1$ thereby runs towards the breakthrough D. The variotherm heatable channel thereby has a circular configuration about the entire breakthrough and converges in the discharge $F_2$. Inflow $F_1$ and outflow $F_2$ are thereby disposed situated exactly one opposite the other. The variotherm heatable channel is hence branched in the region of the breakthrough D and is guided annularly about the breakthrough D. The variotherm heatable channel VK is thereby guided up to an overflow opening ÜL which is introduced in the wall of the injection mould (preferably the narrow side), by means of which excess thermoplastic moulding compound can emerge from the injection mould. With such an injection mould, the method according to the invention can be implemented, as described subsequently in detail. The explanations given for this injection mould also apply for all subsequent embodiments.

FIG. 7 shows the injection mould which is identical to that illustrated in FIG. 6, an overflow capacity UK is hereby disposed at the overflow opening ÜL, which represents a collecting reservoir for the thermoplastic moulding compound. At the gate location of the injection mould, a so-called hot channel ("hot runner", HR) is fitted, via which the thermoplastic moulding compound can be fed into the injection mould. The variotherm channel VK is thereby illustrated in a dark colour in comparison with the remaining region of the injection mould. The course is thereby identical to the course illustrated in FIG. 6.

The following assumptions are hereby taken as basis:
Moulding Compound Comprising Reinforcing Fibres:
Polyamide 6T/6I (70:30) with glass fibre filling (degree of filling 50% by weight, glass fibre diameter: 10 μm, glass fibre length in the component: 200 μm), melting point: 325° C.), crystallisation temperature: $\vartheta_K$=285° C., MVR (340° C./21.6 kg)=100 cm$^3$/10 min, melt viscosity (340° C., shear rate of 1,000 Hz)=230 Pas.
Method Parameters:
    temperature of the remaining mould wall: $\vartheta_W$=150° C.
    temperature of the moulding compound during filling and overfilling: $\vartheta_{FM}$=340° C.
    temperature of the variotherm channel along the trajectory during filling and over filling in the dwell pressure phase: $\vartheta_{VT}$=305° C.,
    injection speed (flow rate) during filling: 15 cm$^3$/s
    switching point to dwell pressure: as soon as an injection pressure of 25 MPa is reached, switching takes place from flow rate-controlled filling to pressure-controlled)
    dwell pressure in the first part of the dwell pressure phase: a pressure of 60 MPa is maintained for 10 seconds
    dwell pressure in the second part of the dwell pressure phase: a pressure of 120 MPa is applied for 6 seconds, the plastic material melt (moulding compound) being pressed into the overflow cavity along a trajectory
    dwell pressure in the third part of the dwell pressure phase: a pressure of 2.5 MPa is applied for 1 second (in total the dwell pressure phase lasts 17 seconds)
    filling time: 1.6 seconds (99% volume filling without overflow cavity)
    injection pressure at 99% volume filling: 25 MPa volume of the overflow cavity: 8.8 cm³ (is filled during the second part of the dwell pressure phase)
volume of the cavity: 20.38 cm³
volume proportion of the cavity which is overfilled: 43.2%

For the subsequent simulation calculations, the volume of the cavity of the injection mould was subdivided into a grid which in fact is illustrated in FIG. 7. The individual volume elements which are used for the grid are illustrated in detail in FIG. 8.

Figure 9A:
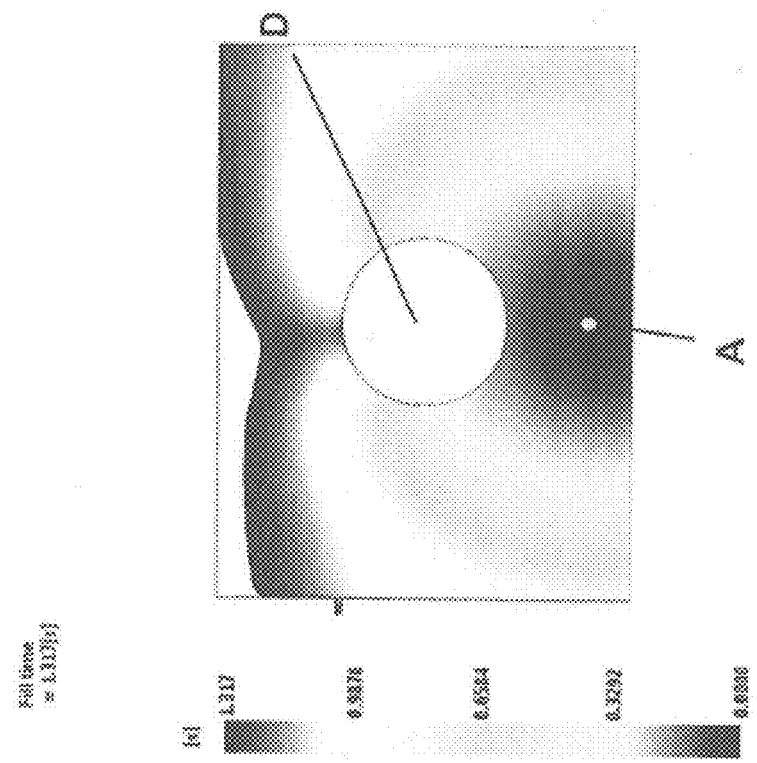
FIG. 9A illustrates the simulated comparison of the filling of an identical injection mould.
Figure 9B:
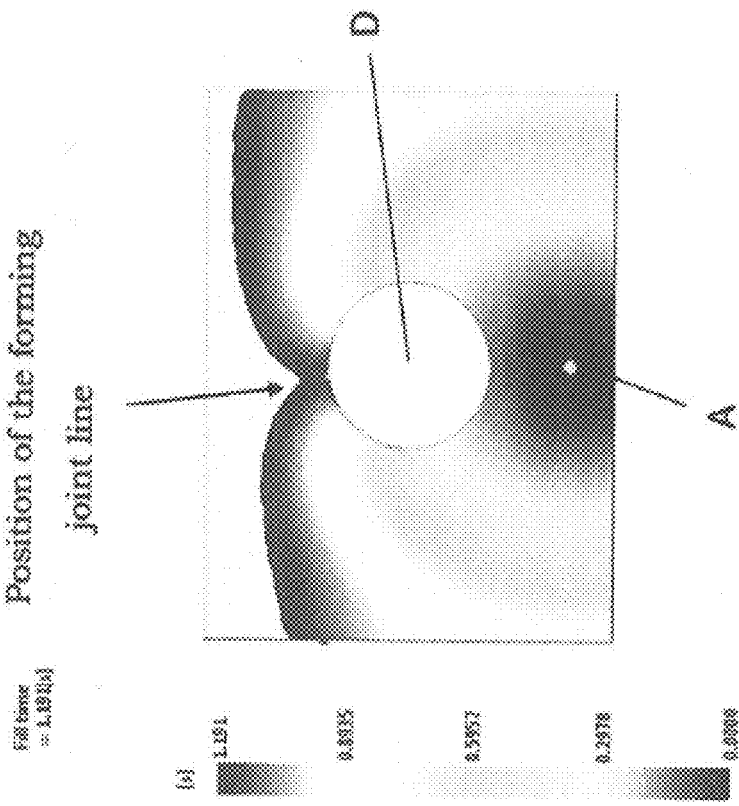
FIG. 9B illustrates the filling process with an injection mould according to the invention.

FIG. 9A shows the simulated comparison of the filling of an identical injection mould according to a method according to the state of the art, as was illustrated in FIG. 3. In FIG. 9B, the filling process is sketched with an injection mould according to the invention, as illustrated in FIG. 6 or 7. It is detectable that the filling behaviour of the injection mould with the thermoplastic moulding compound is essentially identical. Even during the injection moulding method with the injection mould according to the invention (cf. FIG. 9B), a flow about the breakthrough D takes place, here also confluence of the thermoplastic moulding compound takes place on the side of the breakthrough D orientated away from the gate location A. In FIGS. 10A and 10B, temperature profiles which occur within the thermoplastic moulding compound during the injection moulding process are illustrated. In FIG. 10A, different sectional profiles are illustrated, which are present immediately after complete filling of the injection mould or during overfilling of the injection mould. At the regions at which temperature-control of the injection mould on both sides is effected by means of the variotherm heatable channel (not illustrated in FIG. 10A), it is evident that the temperature is above the melt transition temperature (these are the regions I illustrated in FIG. 10A). At the remaining regions (regions II), the temperature of the thermoplastic moulding compound is thereby already below the melt transition temperature. After complete filling of the injection mould, merely the regions at which temperature-control is effected via the variotherm heatable channel are hence still in the molten state, i.e. by further injection of thermoplastic moulding compound via the hot runner HR. At the gate location A, a specific flow of thermoplastic moulding compound can thereby be effected directly at the places at which the variotherm heatable channel or channels are configured.

In FIG. 10B, an envelope (a so-called contour plot) is illustrated, on which the temperature of the thermoplastic moulding compound in the chosen example is still 305° C. It is detectable that these regions are present exclusively at the places at which the variotherm heatable channels are configured. In the remaining regions of the injection mould, these values are not achieved without additional heating, the temperature in these regions is thereby approx. 150° C.

Figure 11B:
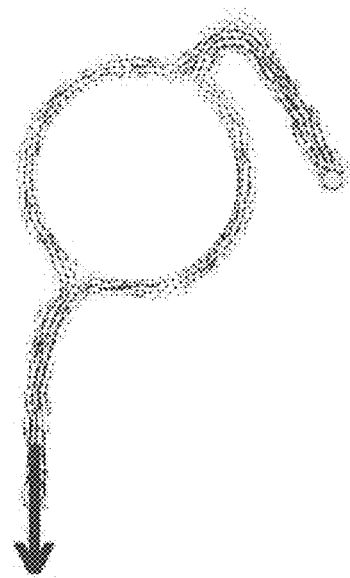
FIGS. 11A and 11B illustrate the speed plot which the thermoplastic moulding compound maintains inside the cavity of the injection mould.
Figure 11A:
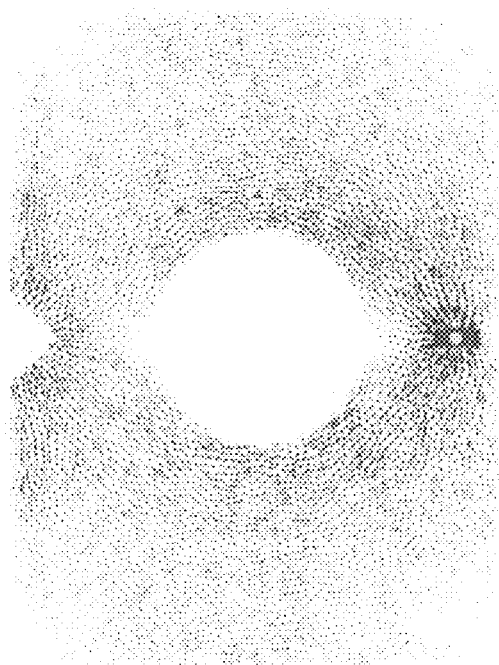

In FIGS. 11A and 11B, the speed plot which the thermoplastic moulding compound maintains inside the cavity of the injection mould is illustrated. The speed profile is illustrated hereby as a vector, the arrows thereby indicate the flow direction, the length of the arrows thereby corresponds to the speed.

In FIG. 11A, the speed profile of an injection mould without a variotherm heatable channel is illustrated. It is detectable that the flow direction of the thermoplastic moulding compound is effected essentially symmetrically until the injection mould is filled completely.

In FIG. 11B, the situation which arises with partial overfilling of the injection mould is illustrated. It is evident that a flow of thermoplastic moulding compound is effected exclusively only in the variotherm heatable regions, the flow of the thermoplastic moulding compound thereby essentially follows along the prescribed trajectory through the variotherm heatable channel.

Figure 12:
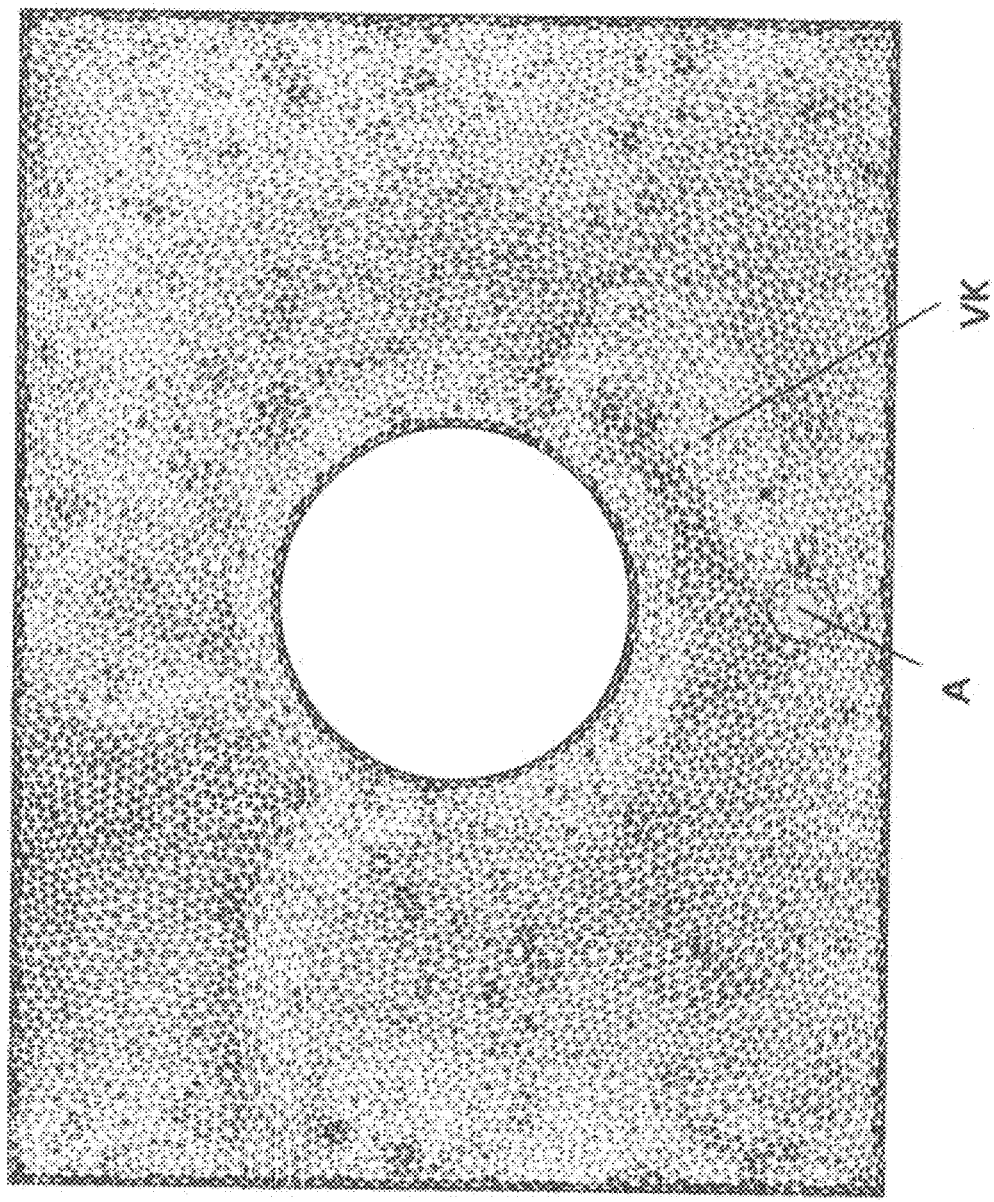
FIG. 12 illustrates reproduction of the fibre distribution, which distribution is produced during implementation of the method of the invention.

In FIG. 12, the fibre distribution is reproduced, which distribution is produced during implementation of the method according to the invention. It is detectable that the fibre distribution in the region of the variotherm channel has an essentially anisotropic configuration and follows the trajectory of the variotherm heatable channel.

Figure 13A:
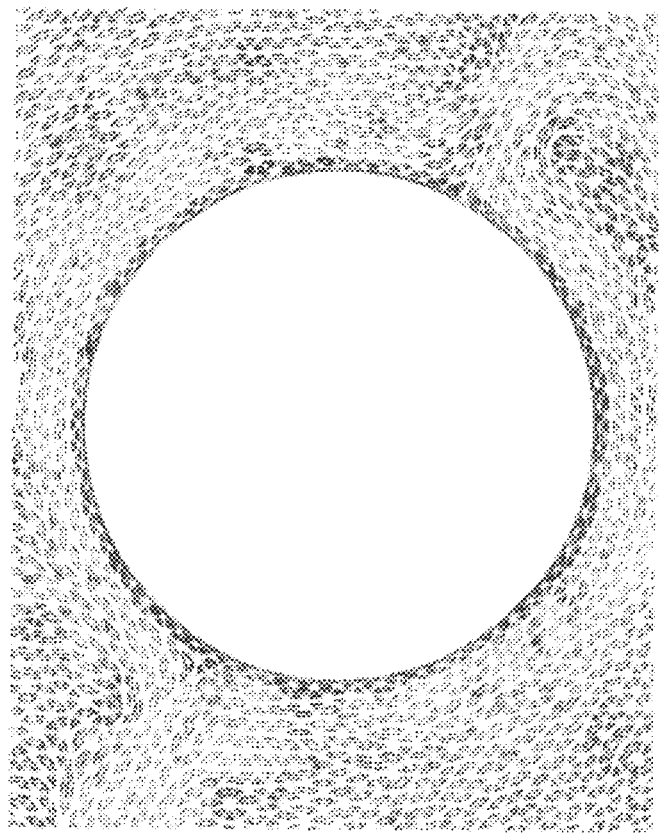
FIGS. 13A and 13B illustrate the tensile forces which occur in the produced moulded part during tensile loading and the fibre distribution in a component produced according to the method of the invention.
Figure 13B:
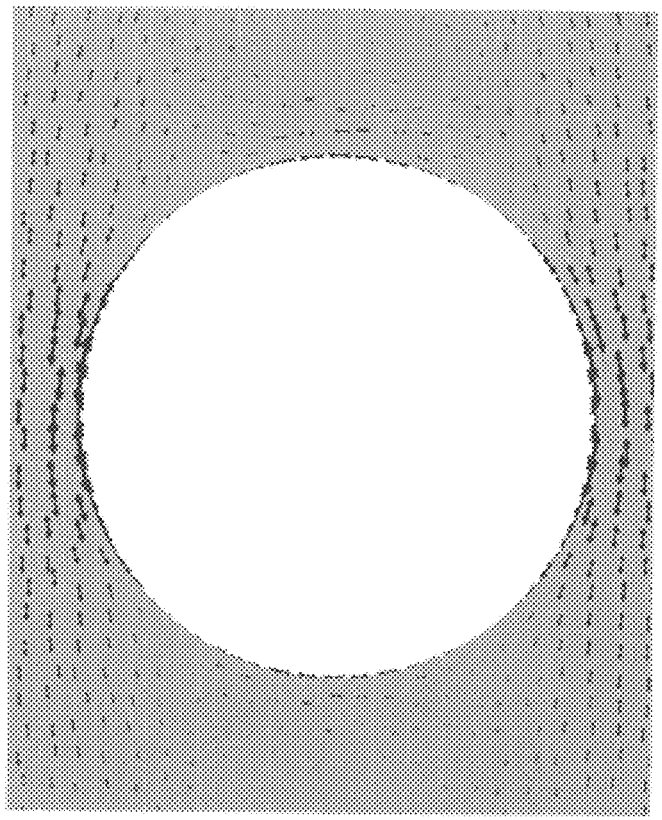

In FIGS. 13A and 13B, analogously to FIGS. 5A and 5B, the tensile forces which occur in the produced moulded part during tensile loading and the fibre distribution in a component produced according to the method according to the invention are once again compared. It is detectable that the fibre orientation (FIG. 13A) is effected precisely at the places at which the highest tensile forces (FIG. 13B) occur, is effected exactly along the tensile forces. The fibres can hence optimally absorb the occurring tensile stress.

In FIG. 14, the fibre distribution which occurs during the method according to the invention, termed here fibre orientation method, is reproduced. Calculation of the fibre distribution is thereby effected at a place which is effected in the region of the variotherm heatable channel opposite the gate location. The determination location is thereby illustrated on the left in FIG. 14 by the black dot in the schematic illustration. At this location, the local coordinate system, i.e. the considered x-component which is produced by the tangent to the trajectory of the variotherm channel, coincides with the principal tensile load direction. It is detectable that, with a conventional production method, an essentially isotropic fibre distribution with respect to the fibre orientation in x- or y-direction is effected. The fibres are mainly orientated in y-direction at this place, whilst a corresponding orientation of the fibres in x-direction is only of subordinate significance.

As is evident furthermore from FIG. 14, it can be achieved with the method according to the invention that the fibre distribution in x-direction becomes clearly uppermost, i.e. the fibres at the measured place in x-direction have a significantly anisotropic distribution and the main part of the fibres there is predominantly in the x-direction. Hence the fibres at this place are optimally orientated for absorbing the occurring tensile forces in the component.

FIGS. 15A and 15B show test results of a simulation test on components which were produced above according to the state of the art (FIG. 15A) and also were produced according to the method according to the invention (FIG. 15B). In this test, a tensile load of 1,350 N is applied on the narrow sides of the moulded parts and the moulded parts are subject to the indicated force, as illustrated in FIG. 1.

The standard variant according to FIG. 15A with joint line and the variant variotherm with scoured joint line according to FIG. 15B were compared with each other with the help of finite element (FE) calculations. The FE calculations were thereby implemented taking into account the fibre orientation from the injection moulding simulation and an anisotropic material model with a failure criterion. The model of the sheet with a hole (dimensions 100×75×3 mm with diameter 30 mm) was secured on the one side in all directions, whereas a force perpendicular to the surface was applied externally on the opposite side. The calculations show failure of the model of the standard variant with joint line at 7,965 N and, with the variotherm variant with scoured joint line of 12,015 N. This represents an improvement of 51%.

Both FIGS. 15A and 15B show colour plots of the failure criterion which was used during loading with 1,350 N. The legend thereby shows the reciprocal value of the safety factor. For example a value of 0.112 therefore means safety relative to failure with this load of 1/0.112=8.9. It becomes clear that the standard variant with joint line has the joint line as a potential failure region, whereas the variotherm variant with scoured joint line no longer reveals the joint line, but rather shows the two notch regions of the whole as potential failure regions.

The invention claimed is:

1. A method for the production of moulded parts from thermoplastic moulding compounds comprising reinforcing fibres by injection moulding, in which
    a cavity of an injection mould is overfilled with a thermoplastic moulding compound which is heated to a prescribed temperature $\vartheta_{FM}$, is present in the plasticised state and comprises reinforcing fibers, the cavity of the injection mould having in at least one wall at least one variotherm heatable channel extending along a trajectory,
    the injection mould having at least one overflow cavity, the respective overflow cavity being in fluidic communication with the cavity of the injection mould, the at least one variotherm heatable channel beginning at a gate location of the injection mould and being guided up to the at least one overflow cavity so that the thermoplastic moulding compound can emerge out of the cavity of the injection mould and enter into the respective overflow cavity via the at least one overflow cavity;
    before, during and/or after filling of the injection mould, the region of the injection mould which has the at least one variotherm channel of the wall is set to a temperature $\vartheta_{VT}$ and the remaining region of the wall of the injection mould is set, permanently or at least at times, to a temperature $\vartheta_W$, wherein $\vartheta_W < \vartheta_{VT}$,
    after overfilling, the thermoplastic moulding compound comprising the reinforcing fibres is cooled until solidification, and the solidified moulded part is released from the injection mould;
    wherein, at least one of the following conditions is satisfied when filling the injection mould with the thermoplastic compound or when the thermoplastic moulding compound is cooled after the filling:

$$\vartheta_{VT} = \vartheta_{FM} \pm 40 \text{ K}.$$

2. The method according to claim 1, wherein the overfilling of the injection mould is effected such that 5 to 100% by volume of the cavity of the injection mould is overfilled, after complete filling, a waiting time of 2 to 60 s is maintained before overfilling is commenced.

3. The method according to claim 1, wherein by adjustment of the temperature difference $\vartheta_W < \vartheta_{VT}$, an adjustment of the orientation of the reinforcing fibres in the thermoplastic moulding compound is effected, thereby an essentially anisotropic orientation of the reinforcing fibres along the trajectory of the at least one variotherm heatable channel being achieved.

4. The method according to claim 3, wherein the orientation of the reinforcing fibres is defined by an orientation tensor $(a_{ij})$ of a group of n reinforcing fibres contained in one finite volume element, with $$(a_{ij}) = \begin{pmatrix} a_{11} & a_{12} & a_{13} \\ \ldots & a_{22} & a_{23} \\ \ldots & \ldots & a_{33} \end{pmatrix}$$

the elements $a_{ij}$ of which are defined as follows $$a_{ij} = \frac{1}{n} \sum_{k=1}^{n} a_{ij}^k = \frac{1}{n} \left( \sum_{k=1}^{n} p_i^k p_j^k \right)$$

the orientation of the fibres being determined by the diagonal elements $a_{11}$, $a_{22}$ and $a_{33}$ of the orientation tensor $(a_{ij})$,
$p_i^k$ or $p_j^k$ respectively representing the components of a vector $\vec{p^k}$ of length which extends parallel to the $k^{th}$ fibre, whereby it applies that $$\vec{p^k} = \begin{pmatrix} p_1^k \\ p_2^k \\ p_3^k \end{pmatrix}$$

the vector $\vec{p^k}$ being indicated in each considered finite volume element of the region of the at least one variotherm heatable channel respectively in a local coordinate system, in which
the x-axis in the respective considered finite volume element is fixed respectively tangentially to the trajectory of the at least one variotherm heatable channel,
the y-axis is orientated perpendicular to x,
the z-axis is orientated perpendicular to x and y,
an essentially anisotropic orientation then being produced if the value of the element au of the orientation tensor $(a_{ij})$ in each given finite volume element is at least 0.5.

5. The method according to claim 1, wherein:

$$\vartheta_{VT} > \vartheta_G \text{ or } \vartheta_{VT} > \vartheta_K,$$

$\vartheta_G$ meaning the glass transition temperature of amorphous thermoplastic moulding compound and k the crystallisation temperature of partially crystalline thermoplastic moulding compound,
and/or $$\vartheta_{VT} - \vartheta_W \geq 50 \text{ K}.$$

6. The method according to claim 1, wherein the at least one variotherm heatable channel is configured on one or both sides of the cavity in the wall of the injection mould.

7. The method according to claim 1, wherein the sum of the area of the at least one variotherm heatable channel constitutes 1 to 50% of the inner surface of the cavity of the injection mould.

8. The method according to claim 1, wherein the injection mould has at least one breakthrough which causes a gap in the moulded part that is to be produced.

9. The method according to claim 8, wherein the at least one variotherm heatable channel is configured in a way extending completely or at least in regions circumferentially about the at least one breakthrough so the variotherm heatable channel which encloses the respective breakthrough is respectively configured on one or both sides of the cavity in the wall of the injection mould.

10. The method according to claim 9, wherein the at least one variotherm channel, which is configured in a way extending completely or at least in regions circumferentially about the at least one breakthrough, has at least one continuation in an inflow direction and at least one continuation in an outflow direction.

11. The method according to claim 10, wherein the continuation in the inflow direction and the continuation in the outflow direction are disposed offset relative to each other in projection of the breakthrough.

12. The method according to claim 10, wherein the moulded part to be produced has a principal tensile load direction in use, respectively the continuation in the inflow direction and the continuation in the outflow direction having a direction, independently of each other in projection of the breakthrough which deviates by at most 60° from the principal tensile load direction.

13. The method according to claim 1, wherein
a) the thermoplastic moulding compound comprises or consists of at least one thermoplastic matrix polymer or a mixture of at least two thermoplastic matrix polymers in which the reinforcing fibres are present in a dispersed state,
b) the reinforcing fibres are selected from the group consisting of glass fibres, carbon fibres and titanium whiskers, and/or
c) the weight proportion of the reinforcing fibres in the thermoplastic moulding compound is from 5 to 80% by weight.

14. The method according to claim 1, wherein
a) the shear viscosity of the thermoplastic moulding compound in the case of a shear rate of 100 to 10,000 Hz, measured according to ISO 11443, is in the range of 10 to 10,000 Pas,
b) is adjusted and/or
c) the thermoplastic moulding compound is injected into the cavity of the injection mould with a pressure of 50 to 2,000 bar.

15. The method according to claim 10, wherein the continuation in the inflow direction and the continuation in the outflow direction are disposed offset relative to each other by at least 120°.

16. The method according to claim 10, wherein the continuation in the inflow direction and the continuation in the outflow direction are disposed offset relative to each other by 180°±10°.

* * * * *